US012394146B1

(12) United States Patent
Drummond et al.

(10) Patent No.: US 12,394,146 B1
(45) Date of Patent: Aug. 19, 2025

(54) METHODS AND SYSTEMS FOR COMPOSING AND EXECUTING A SCENE

(71) Applicant: Apple Inc., Cupertino, CA (US)

(72) Inventors: Mark E. Drummond, Palo Alto, CA (US); Daniel L. Kovacs, Santa Clara, CA (US); Shaun D. Budhram, Los Gatos, CA (US); Edward Ahn, San Francisco, CA (US); Behrooz Mahasseni, San Jose, CA (US); Aashi Manglik, Sunnyvale, CA (US); Payal Jotwani, Santa Clara, CA (US); Mu Qiao, Campbell, CA (US); Bo Morgan, Emerald Hills, CA (US); Noah Gamboa, San Franciso, CA (US); Michael J. Gutensohn, San Francisco, CA (US); Dan Feng, Santa Clara, CA (US); Siva Chandra Mouli Sivapurapu, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 355 days.

(21) Appl. No.: 17/947,503

(22) Filed: Sep. 19, 2022

Related U.S. Application Data

(60) Provisional application No. 63/246,631, filed on Sep. 21, 2021.

(51) Int. Cl.
*G06T 17/00* (2006.01)
*G06F 3/01* (2006.01)
*G06V 10/98* (2022.01)

(52) U.S. Cl.
CPC .............. *G06T 17/00* (2013.01); *G06F 3/013* (2013.01); *G06V 10/987* (2022.01)

(58) Field of Classification Search
CPC ........ G06T 17/00; G06F 3/013; G06V 10/987
See application file for complete search history.

(56) References Cited

U.S. PATENT DOCUMENTS

| 9,727,996 | B2 | 8/2017 | Pandey et al. |
| 9,898,873 | B2 | 2/2018 | Yu |
| 9,916,002 | B2 | 3/2018 | Petrovskaya et al. |
| 10,203,762 | B2 | 2/2019 | Bradski et al. |
| 10,459,518 | B2 | 10/2019 | Lutnick et al. |

(Continued)

FOREIGN PATENT DOCUMENTS

EP    2546806 B1    5/2019

*Primary Examiner* — Chong Wu
(74) *Attorney, Agent, or Firm* — Fernando & Partners, LLP

(57) ABSTRACT

In one implementation, a method of composing a scene content is performed at a device including a display, one or more processors, and non-transitory memory. The method includes generating a definition of a scene based on textual or speech input and a model of a physical environment, wherein the definition includes a constraint that defines a spatial relationship between a virtual asset and an anchor asset that corresponds to one or more physical objects in the physical environment. The method includes generating, based on the definition of the scene and the model of the physical environment, a first instance of the scene that satisfies the constraint with the virtual asset in the spatial relationship with a first one of the one or more physical objects in the physical environment. The method includes presenting, on the display, the first instance of the scene.

20 Claims, 31 Drawing Sheets

(56) References Cited

U.S. PATENT DOCUMENTS

| | | |
|---|---|---|
| 10,634,913 B2 | 4/2020 | Nair et al. |
| 10,719,993 B1 | 7/2020 | Ha |
| 11,989,404 B1* | 5/2024 | McGinnis ............... G06F 3/011 |
| 2014/0282220 A1 | 9/2014 | Wantland et al. |
| 2015/0185825 A1 | 7/2015 | Mullins |
| 2016/0253844 A1* | 9/2016 | Petrovskaya .......... G06Q 50/01 |
| | | 345/633 |
| 2021/0044636 A1 | 2/2021 | Miller |
| 2021/0110610 A1* | 4/2021 | Xu ......................... G06V 20/20 |
| 2024/0320489 A1* | 9/2024 | Vandikas ................ H04L 51/10 |

* cited by examiner

METHODS AND SYSTEMS FOR COMPOSING AND EXECUTING A SCENE

CROSS-REFERENCE TO RELATED APPLICATIONS

This application relates to U.S. Provisional Patent App. No. 63/246,631, filed on Sep. 21, 2021, which is hereby incorporated by reference in its entirety.

TECHNICAL FIELD

The present disclosure generally relates to a graphical user interface for composing a scene and executing the scene in an extended reality (XR) environment.

BACKGROUND

In various implementations, a scene includes virtual content to be presented in an XR environment based on a physical environment. It may be desirable to present the scene in various different XR environments based on various different physical environments.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
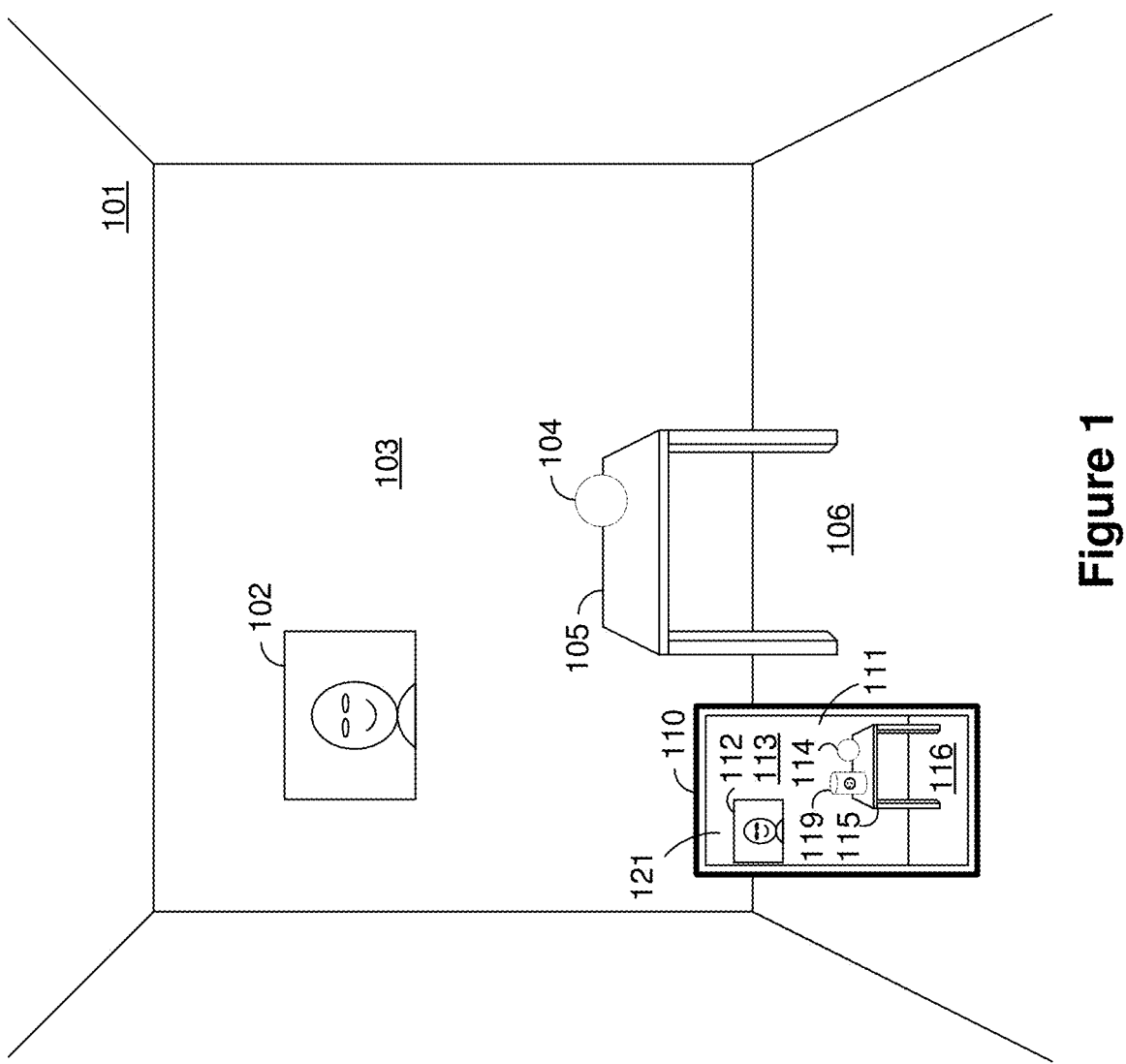
FIG. 1 illustrates a physical environment with an electronic device surveying the physical environment.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for composing a scene. In various implementations, a method is performed at a device including a display, one or more processors, and non-transitory memory. The method includes generating a definition of a scene based on textual or speech input and a model of a physical environment, wherein the definition includes a constraint that defines a spatial relationship between a virtual asset and an anchor asset that corresponds to one or more physical objects in the physical environment. The method includes generating, based on the definition of the scene and the model of the physical environment, a first instance of the scene that satisfies the constraint with the virtual asset in the spatial relationship with a first one of the one or more physical objects in the physical environment. The method includes presenting, on the display, the first instance of the scene.

Various implementations disclosed herein include devices, systems, and methods for composing a scene. In various implementations, a method is performed at a device including a display, one or more processors, and non-transitory memory. The method includes obtaining a definition of a scene, wherein the definition includes a constraint that defines a spatial relationship between a virtual asset and an anchor asset that corresponds to one or more objects in an environment. The method includes generating, based on the definition of the scene and a model of the environment, a first instance of the scene that satisfies the constraint with the virtual asset in the spatial relationship with a first one of the one or more objects in the environment and a second instance of the scene that satisfies the constraint with the virtual object in the spatial relationship with a second one of the one or more objects in the environment. The method includes simultaneously presenting, on the display, the first instance of the scene and the second instance of the scene.

Various implementations disclosed herein include devices, systems, and methods for composing a scene. In various implementations, a method is performed at a device including a display, one or more processors, and non-transitory memory. The method includes obtaining a definition of a scene, wherein the definition of the scene includes a definition of a property of an environment, wherein the definition of the scene includes definition of a spatial relationship between a virtual asset and an anchor asset corresponding to one or more objects in the environment. The method includes obtaining a first virtual environment with the property. The method includes presenting, on the display and based on the definition of the scene, a first instance of the scene that includes the virtual asset in the spatial relationship with a first object in the first virtual environment corresponding to the anchor asset.

In accordance with some implementations, a device includes one or more processors, a non-transitory memory, and one or more programs; the one or more programs are stored in the non-transitory memory and configured to be executed by the one or more processors. The one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

In various implementations, a scene including virtual content is presented in various different XR environments based on various different physical environments with different physical characteristics, such as different sets of physical objects present in the physical environment. Described below is a graphical user interface (GUI) for composing a scene for presentation in various different XR environments. Also described below are methods and systems for presenting the scene in various different XR environments.

In various implementations, composing the scene includes generating a scene definition by adding definitions of virtual assets to the scene definition, adding definitions of anchor assets to the scene definition, and defining constraints and/or preferences for how the virtual assets are displayed in relation to detected instances of the anchor assets. Defining these constraints and/or preferences to ensure a predictable and pleasurable user experience in unknown physical environments can be time-consuming and require extensive thought and imagination. Accordingly, in various implementations, the GUI includes a feature for presenting instances of the scene in various physical environments and, based on feedback from the user, adjusting the scene definition.

FIG. 1 illustrates a physical environment 101 with an electronic device 110 surveying the physical environment 101. The physical environment 101 includes a picture 102 hanging on a wall 103, a table 105 on a floor 106, and a ball 104 on the table 105.

The electronic device 110 displays, on a display, an image of an XR environment 121 which includes a representation of the physical environment 111 and a representation of a virtual object 119. In various implementations, the representation of the physical environment 111 is generated based on an image of the physical environment 101 captured with one or more cameras of the electronic device 110 having a field-of-view directed toward the physical environment 101. Suitable cameras include scene cameras, event cameras, depth cameras, and so forth. Accordingly, the representation of the physical environment 111 includes a representation of the picture 112 hanging on a representation of the wall 113, a representation of the table 115 on a representation of the floor 116, and a representation of the ball 114 on the representation of the table 115.

In addition to the representations of real objects of the physical environment 101, the image of the XR environment 121 includes a representation of the virtual object 119. The visual appearance of the virtual object 119 is defined by software on the electronic device 110. The electronic device 110 presents the virtual object 119 as resting on the top surface of the representation of the table 115 by accounting for the position and orientation of device 110 relative to table 105.

Figure 2A:
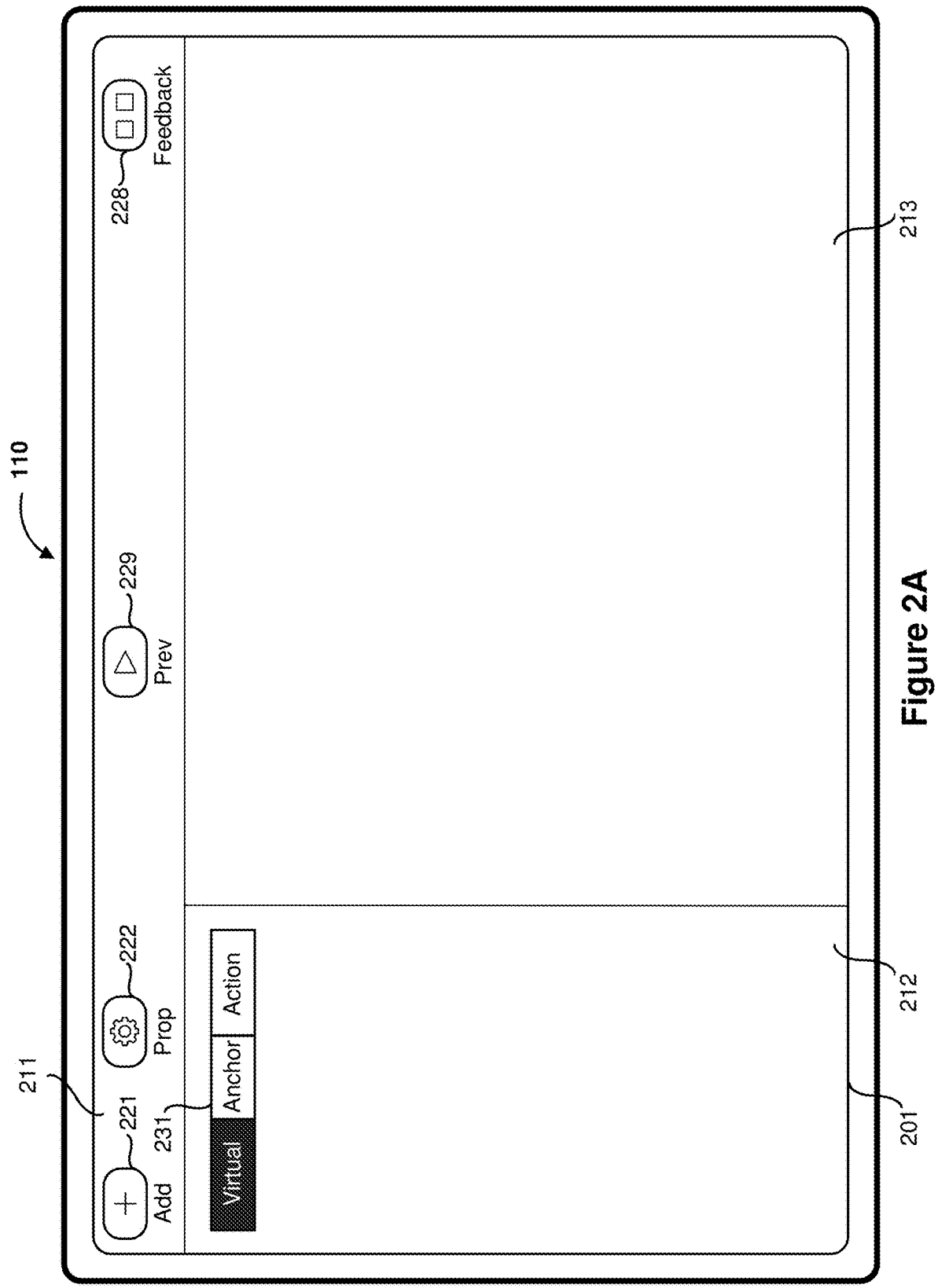
FIGS. 2A-2F illustrate the electronic device of FIG. 1 displaying a graphical user interface (GUI) for composing a scene.

FIG. 2A illustrates the electronic device 110 displaying a graphical user interface (GUI) 201 for composing a scene. In particular, the GUI 201 includes a representation of the scene. In various implementations, an application of the electronic device 110 or a different electronic device executes to present the scene in an XR environment, such as a virtual environment or in association with a representation of a physical environment.

The GUI 201 includes a toolbar region 211, an assets region 212, and a view region 213. The toolbar region 211 includes an asset addition affordance 221 for adding assets to the scene, a properties affordance 222 for manipulating properties of selected assets, a preview affordance 229 for previewing the scene in a physical environment of the electronic device 110, and a feedback affordance 228 for previewing the scene in one or more other environments.

The assets region 212 includes a list of assets associated with the scene. The assets associated with the scene include virtual assets, anchor assets, and action assets. In various implementations, the assets region 212 includes an asset type selection affordance 231 for selecting which type of asset is listed in the assets region 212, e.g., a list of virtual assets, a list of anchor assets, or a list of action assets.

The view region 213 includes a representation of the scene. In various implementations, the representation of the scene includes representations of the virtual assets associated with the scene. In various implementations, the representation of the scene includes representations of the anchor assets associated with the scene. In various implementations, the representation of the scene includes representations of the action assets associated with the scene.

In various implementations, a virtual asset associated with the scene includes a description of virtual content which is displayed in association with a physical environment when the scene is executed. In various implementations, a virtual asset includes a description of one or more virtual objects. In various implementations, a virtual asset includes a description of a virtual objective-effectuator. In various implementations, a virtual objective-effectuator receives objectives and determines actions to achieve those objectives, wherein each of the actions is associated with an animation or animation heuristic of the virtual objective-effectuator such that the virtual objective-effectuator is displayed performing the action. For example, in various implementations, the objective for a virtual dog objective-effectuator may be to hold a virtual bone on a physical floor. To achieve the objective, the virtual dog objective-effectuator determines a series of actions of jumping off a physical couch onto the physical floor (associated with a jump-down animation), walking along the physical floor to a location of the virtual bone (associated with a walking animation), and picking up the virtual bone (associated with a pick-up animation).

In various implementations, an anchor asset associated with the scene includes a description of an object which may or may not be present in an environment. In particular, in various implementations, an anchor asset includes a description of at least one object criteria which may be met by a physical object in a physical environment or by a virtual object in a virtual environment. For example, in various implementations, an anchor asset includes a description of a horizontal plane at a particular height and of a particular width. In various implementations, the anchor asset corresponds to the top of a physical table in a first physical environment and the top of a physical desk in a second physical environment. In various implementations, the anchor asset corresponds to a virtual stool in a first virtual environment and a virtual chair in a second virtual environment.

In various implementations, an action asset associated with the scene includes a description of an action which is performed in response to a trigger. In various implementations, the actions include movement of a virtual object, playing audio, changing a lighting condition, etc.

In FIG. 2A, the asset type selection affordance 231 indicates that virtual assets are listed in the assets region 212. In FIG. 2A, the scene is not yet associated with any assets. Accordingly, the assets region 212 and the view region 213 is empty.

Figure 2B:
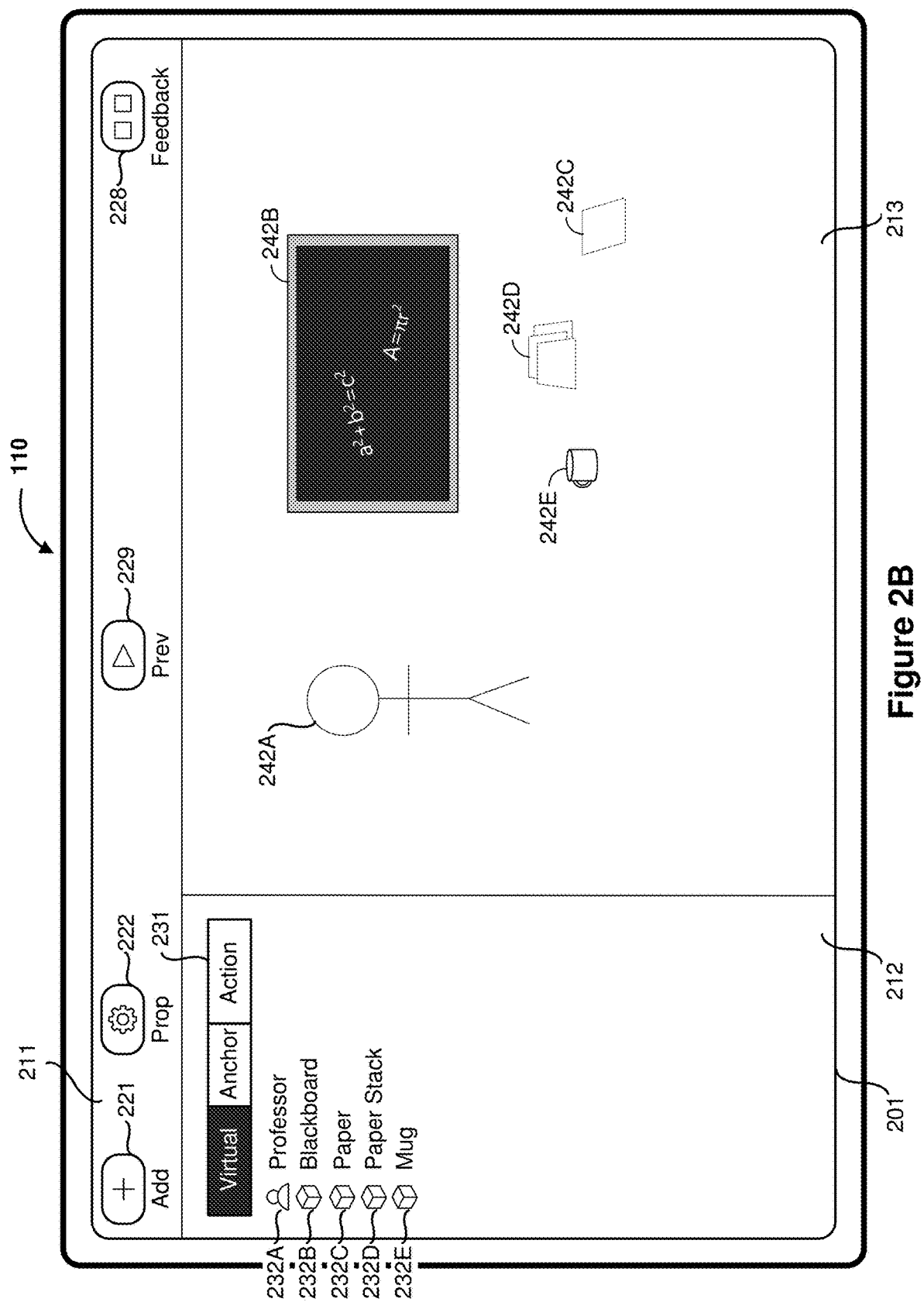

FIG. 2B illustrates the GUI 201 of FIG. 2A in response to the user adding a number of virtual assets to the scene, e.g., by interacting with the asset addition affordance 221 while the asset type selection affordance 231 has virtual assets selected and providing additional user input. In various implementations, the additional user input includes selecting the virtual objects from a library of virtual content. The virtual assets added to the scene include a virtual professor objective-effectuator, a virtual blackboard, a virtual paper, a virtual paper stack, and a virtual mug. Accordingly, the assets region 212 includes a text representation of the virtual professor objective-effectuator 232A, a text representation of the virtual blackboard 232B, a text representation of the virtual paper 232C, a text representation of the virtual paper stack 232D, and a text representation of the virtual mug 232E. Further, the view region 213 includes a graphical representation of the virtual professor objective-effectuator 242A, a graphical representation of the virtual blackboard 242B, a graphical representation of the virtual paper 242C, a graphical representation of the virtual paper stack 242D, and a graphical representation of the virtual mug 242E.

Figure 2C:
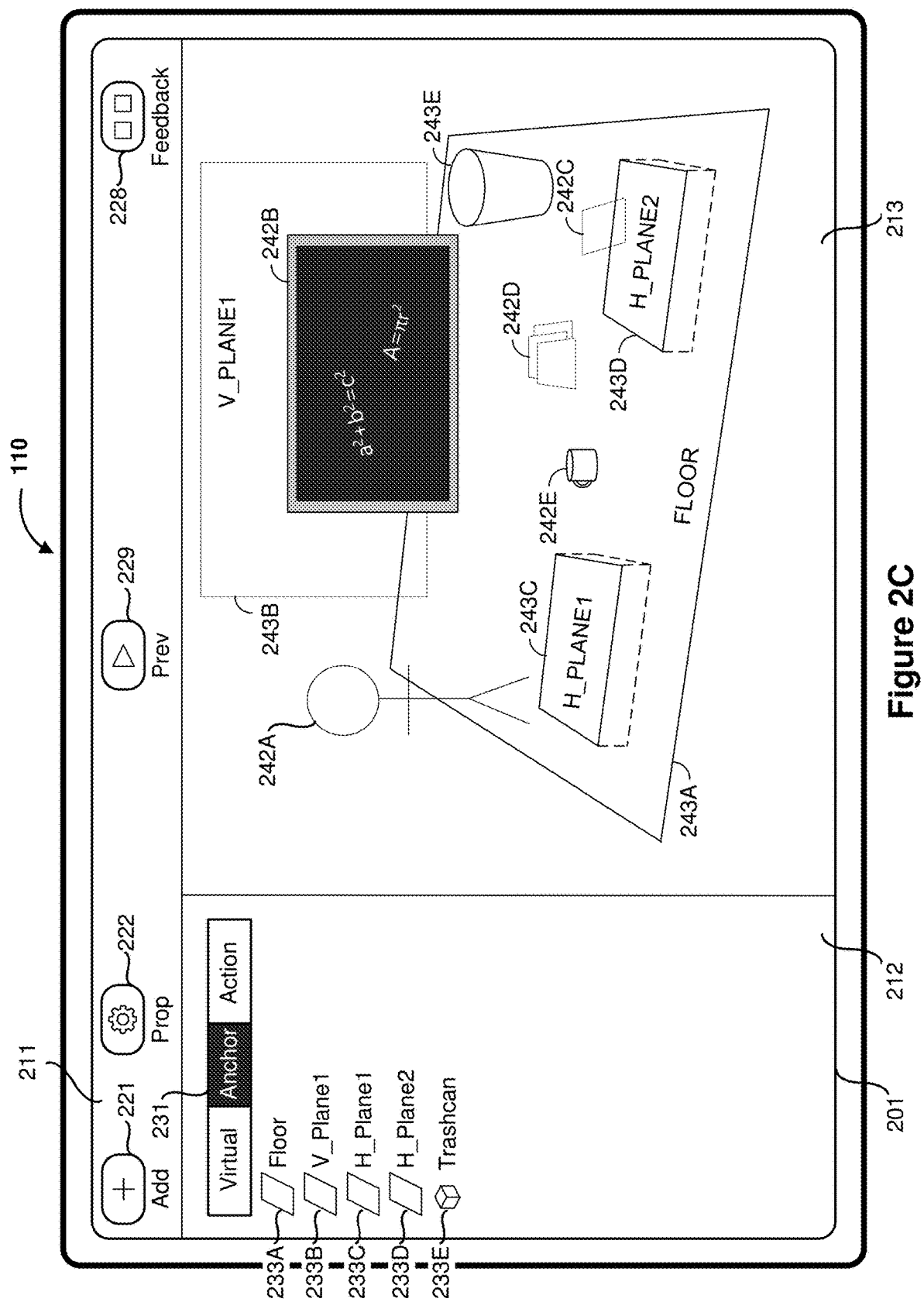

FIG. 2C illustrates the GUI 201 of FIG. 2B in response to the user adding a number of anchor assets to the scene, e.g., by interacting with the asset addition affordance 221 while the asset type selection affordance 231 has anchor assets selected and providing additional user input. In various implementations, the additional user input includes selecting the anchor assets from a library of characteristics that may be present in various environments. In various implementations, the characteristics include surfaces, such as a plane. In various implementations, the characteristics include a horizontal plane or a vertical plane. In various implementations, the characteristics include a floor, a wall, or a ceiling. In various implementations, the characteristics include objects, such as a chair, a trashcan, a baseball, etc. In various implementations, the characteristics include environmental characteristics, such as temperature, humidity, ambient lighting conditions, location, or time-of-day.

The anchor assets added to the scene include an anchor floor, an anchor vertical plane, a first anchor horizontal plane, a second anchor horizontal plane, and an anchor trashcan. Accordingly, the assets region 212 includes a text representation of the anchor floor 233A, a text representation of the anchor vertical plane 233B, a text representation of the first anchor horizontal plane 233C, a text representation of the second anchor horizontal plane 233D, and a text representation of the anchor trashcan 233E. Further, the view region 213 includes a graphical representation of the anchor floor 243A, a graphical representation of the anchor vertical plane 243B, a graphical representation of the first anchor horizontal plane 243C, a graphical representation of the second anchor horizontal plane 243D, and a graphical representation of the anchor trashcan 243E.

Figure 2D:
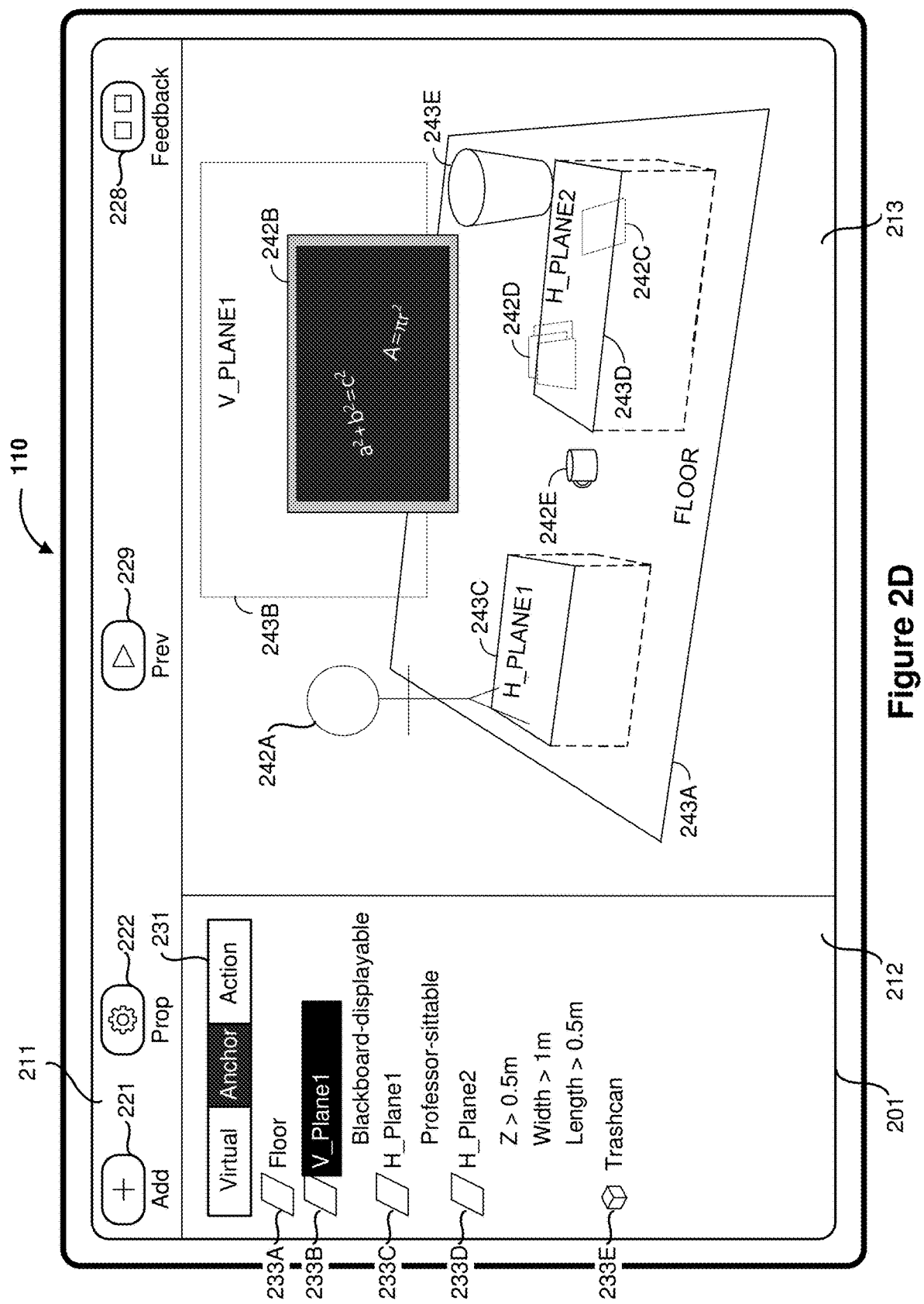

FIG. 2D illustrates the GUI of FIG. 2C in response to the user adding a number of properties to the anchor assets of the scene, e.g., by interacting with the property affordance 222 while particular anchor assets are selected and providing additional user input. For example, the user has added a first property to the anchor vertical plane that it is blackboard-displayable. The first property indicates that anchor vertical plane is capable of having displayed thereupon the virtual blackboard. Similarly, the first property indicates that the virtual blackboard is capable of being (including, in various implementations, allowed to be) displayed upon the anchor vertical plane. In various implementations, the property of being blackboard-displayable is defined by the user of the GUI 201, defined by the creator of the virtual blackboard, or defined by the creator of the GUI 201. In various implementations, the property of being blackboard-displayable is defined as a function of various criteria. For example, in various implementations, the criteria include a height value and a width value being within particular ranges. In various implementations, the criteria include being associated with an object having one of a particular set of object types (e.g., "WALL"). In various implementations, the criteria include being of a uniform color. In various implementations, the criteria include being designated as blackboard-displayable by a user after detection of the vertical plane. In various implementations, the function of the various criteria is that all the defined criteria must be met for a vertical plane to be determined as blackboard-displayable. In various implementations, the function of the various criteria does not require that all the defined criteria be met. For example, in various implementations, a vertical plane is determined as blackboard-displayable if (1) it is of a uniform color and (2A) it is associated with an object type of "WALL" or (2B) its height value and width value are greater than particular thresholds. Thus, as an example, an electronic device detects a wall as a vertical plane, assigns the vertical plane an object type of "WALL", determines that the vertical plane is of a uniform color (e.g., not covered with pictures, posters, or other patterns), and, therefore, determines that the vertical plane is blackboard-displayable. Further, as another example, an electronic device detects the writing surface of a rollaway whiteboard (or the canvas of a blank painting upon an easel) as a vertical plane, detects the whiteboard and assigns it an object type other than "WALL" (e.g., "PARTITION" or "VERTICAL-OTHER"), determines that the height and width of the vertical plane are within particular ranges, determines that the vertical plane is of a uniform color (e.g., not covered with pictures, posters, or other patterns), and, therefore, determines that the vertical plane is blackboard-displayable.

As another example, the user has added a first property to the first anchor horizontal plane that it is professor-sittable. The first property indicates that the first anchor horizontal plane is capable of being sat upon by the virtual professor objective-effectuator. Similarly, the first property indicates that the virtual professor objective-effectuator is capable of being (including, in various implementations, is allowed to be) sat upon the first anchor horizontal plane. In various implementations, the property of being professor-sittable is defined by the user of the GUI 201, defined by the creator of the virtual professor objective-effectuator, or defined by the creator of the GUI 201. In various implementations, the property of being professor-sittable is defined as a function of various criteria. For example, in various implementations, the criteria include a height value, length value, and width value being within particular ranges. In various implementations, the criteria include being associated with an object having one of a particular set of object types (e.g., "CHAIR", "STOOL", "SOFA", etc.). In various implementations, the criteria include being designated as professor-sittable by a user after detection of the horizontal plane. In various implementations, the function of the various criteria is that all the defined criteria must be met for a horizontal plane to be determined as professor-sittable. In various implementations, the function of the various criteria does not require that all the defined criteria be met. For example, in various implementations, a horizontal plane is determined as professor-sittable if (1) it is associated with an object type of "CHAIR" or (2) its height value, length value, and width value are within particular ranges and a user designates the horizontal plane as professor-sittable after detection of the horizontal plane having the height value, length value, and width value within the particular ranges. Thus, as an example, an electronic device detects the seat of a chair as a horizontal plane, detects the chair and assigns it an object type of "CHAIR", and determines that the horizontal plane is professor-sittable. Further, as another example, an electronic device detects the top of a flat rock as a horizontal plane, detects the rock and assigns it an object type of "ROCK" (and does not assign it an object type of "CHAIR"), determines that the height, length, and width of the horizontal plane are within particular ranges, requests that a user designate the horizontal plane as professor-sittable and, in response to an affirmative response from the user, determines that the horizontal plane is professor-sittable.

Further, the user has added a first property to the second anchor horizontal plane that its height value is above 0.5 meters, a second property to the second anchor horizontal plane that its width value is above 1 meter, and a third property to the second anchor horizontal plane that is length value is above 0.5 meters.

Accordingly, in the asset region 212, text representations of the properties are displayed in respective association with the text representation of the anchor assets. Further, in the view region 213, the graphical representations of the anchor assets are modified based on the properties. For example, the graphical representation of the second anchor horizontal plane 243D is displayed with a height value, width value, and length value satisfying the properties.

In various implementations, the user designates each property of an anchor asset as being a preference or a constraint, also referred to an optional property or a required property. If a property is designated as a preference, the scene can be executed in an environment including an object without the property. However, if the property is designated as a constraint, the scene will not be executed in an environment that does not include the object with the property.

Figure 2E:
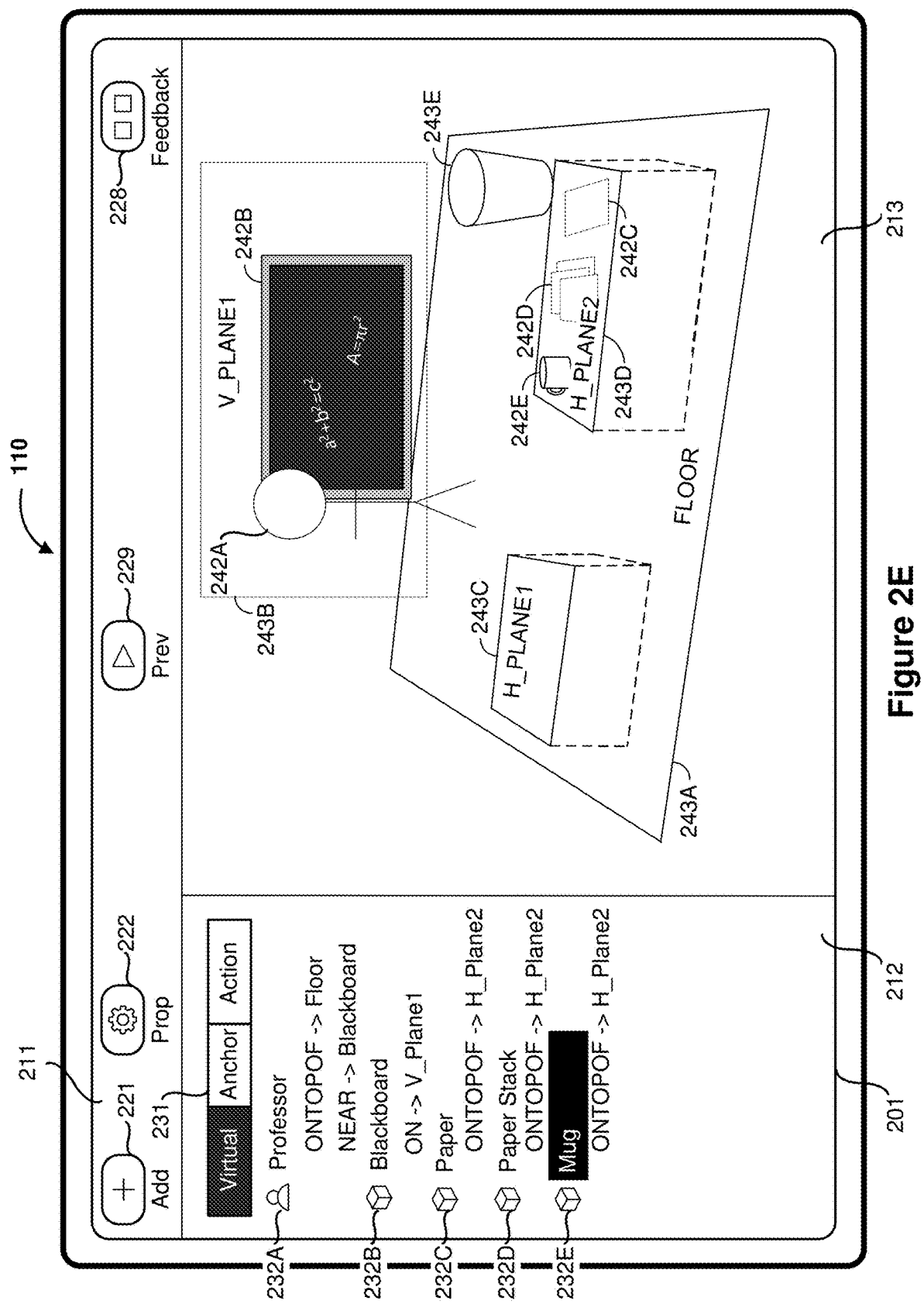

FIG. 2E illustrates the GUI 201 of FIG. 2D in response to the user adding a number of properties to the virtual assets of the scene, e.g., by interacting with the property affordance 222 while particular virtual assets are selected and providing additional user input. For example, the user has added a first property to the virtual professor objective-effectuator that it is on top of the anchor floor and a second property that it is near the virtual blackboard. The user has added a first property to the virtual blackboard that it is on the anchor vertical plane. The user has added a first property to the virtual paper that is on the second anchor horizontal plane. The user has added a first property to the virtual paper stack that is on the second anchor horizontal plane. The user has added a first property to the virtual mug that is on the second anchor horizontal plane.

Accordingly, in the asset region 212, text representations of the properties are displayed in respective association with the text representation of the virtual assets. Further, in the view region 213, the graphical representations of the virtual assets are modified based on the properties. For example, the graphical representation of the virtual blackboard 242B is displayed on the graphical representation of the anchor vertical plane 243B. As another example, the graphical representation of the virtual mug 242E is displayed on the graphical representation of the second anchor horizontal plane 243D.

Figure 2F:
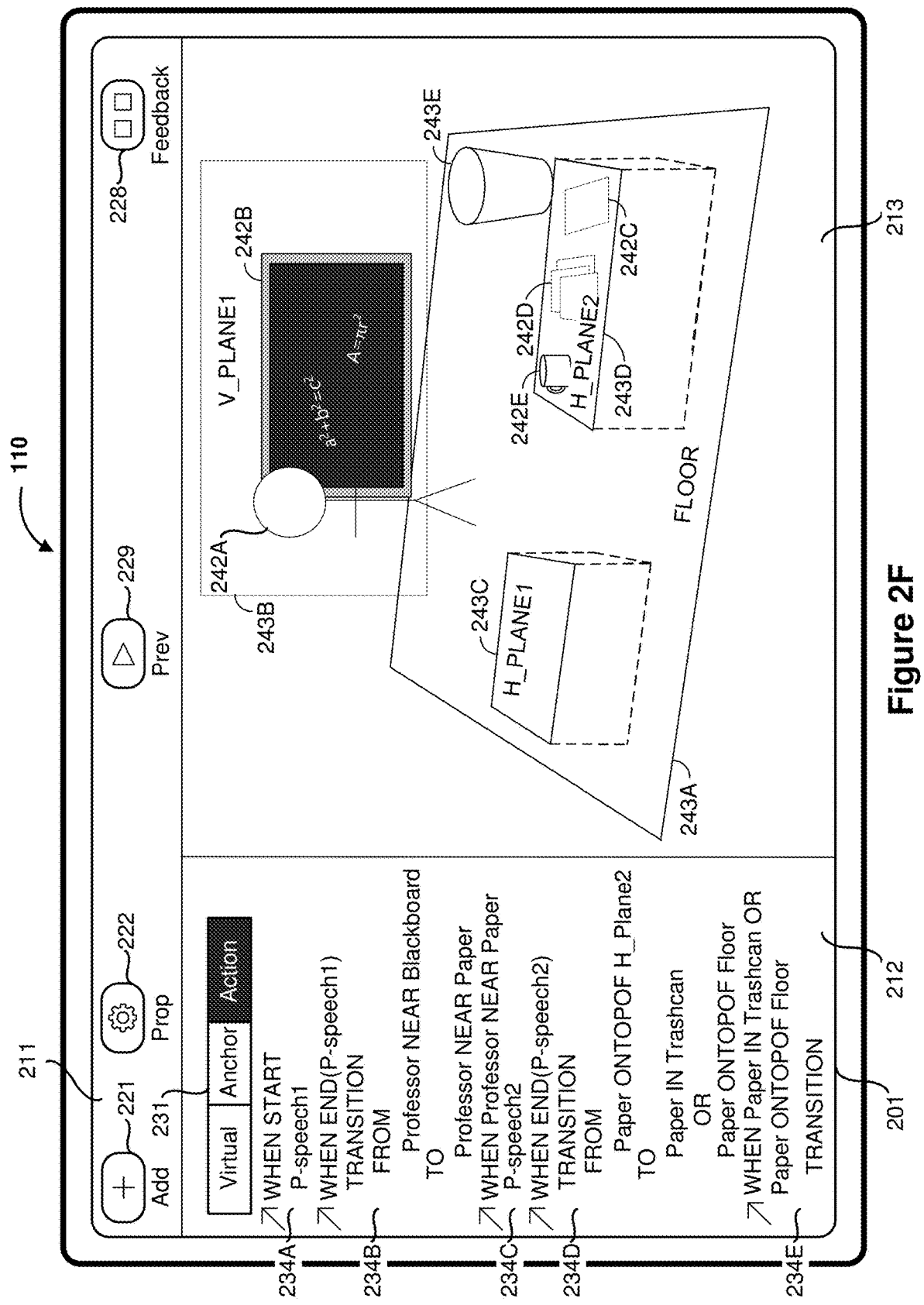

FIG. 2F illustrates the GUI 201 of FIG. 2E in response to the user adding a number of action assets to the scene, e.g., by interacting with the asset addition affordance 221 while the while the asset type selection affordance 231 has action assets selected and providing additional user input.

The action assets include a first action asset illustrated by the text representation of the first action asset 234A. The first action asset describes an action that begins when the scene starts and includes the virtual professor objective-effectuator giving a first speech, which may include both audio and animation of the virtual professor objective-effectuator.

The action assets include a second action asset illustrated by the text representation of the second action asset 234B. The second action asset describes an action that begins when the virtual professor objective-effectuator concludes the first speech and includes the virtual professor objective-effectuator moving from near the virtual blackboard to near the virtual paper.

The action assets include a third action asset illustrated by the text representation of the third action asset 234C. The third action asset describes an action that begins when the virtual professor objective-effectuator is near the virtual paper and includes the virtual professor objective-effectuator giving a second speech.

The action assets include a fourth action asset illustrated by the text representation of the fourth action asset 234D. The fourth action asset describes an action that begins when the virtual professor objective-effectuator concludes the second speech and includes moving the virtual paper from on top of the second anchor horizontal plane to inside the anchor trashcan or on top of the anchor floor. This may be accomplished by the virtual professor objective-effectuator picking up the virtual paper and throwing it into the anchor trashcan or onto the anchor floor.

The action assets include a fifth action asset illustrated by the text representation of the fifth action asset 234E. The fifth action asset describes an action that begins when the virtual paper is inside the anchor trashcan or on top of the anchor floor and includes the virtual professor objective-effectuator sitting on the first anchor horizontal plane, which is professor-sittable.

For each of the anchor assets of the scene, the electronic device 110 determines whether the anchor asset is required to execute the scene or optional to enhance the scene. In various implementations, the anchor asset is designated as required or optional by the user. In various implementations, an anchor asset is required if a virtual asset is necessarily displayed in association with the anchor asset. For example, the anchor floor is required because the virtual professor objective-effectuator is displayed on top of an object corresponding to the anchor floor. Similarly, the anchor vertical plane is required because the virtual blackboard is displayed on an object corresponding to the anchor vertical plane. The first anchor horizontal plane is required because the virtual professor objective-effectuator is displayed sitting on an object corresponding to the first anchor horizontal plane after the fifth action is performed. The second anchor horizontal plane is required because the virtual paper, the virtual paper stack, and the virtual mug are displayed on top of an object corresponding to the second anchor horizontal plane. In contrast, the anchor trashcan is optional because while the virtual paper can be displayed inside an object corresponding to the anchor trashcan after the fourth action is performed, the virtual paper object can instead, if no object corresponding to the anchor trashcan is present in the environment, be displayed on top of an object corresponding to the anchor floor after the fourth action is performed.

FIGS. 3A-3E illustrate a preview of the scene in a first physical environment in which the electronic device 110 is present. In various implementations, the preview of the scene is displayed in response to the user selecting the preview affordance 229 while in the first physical environment.

Figure 3A:
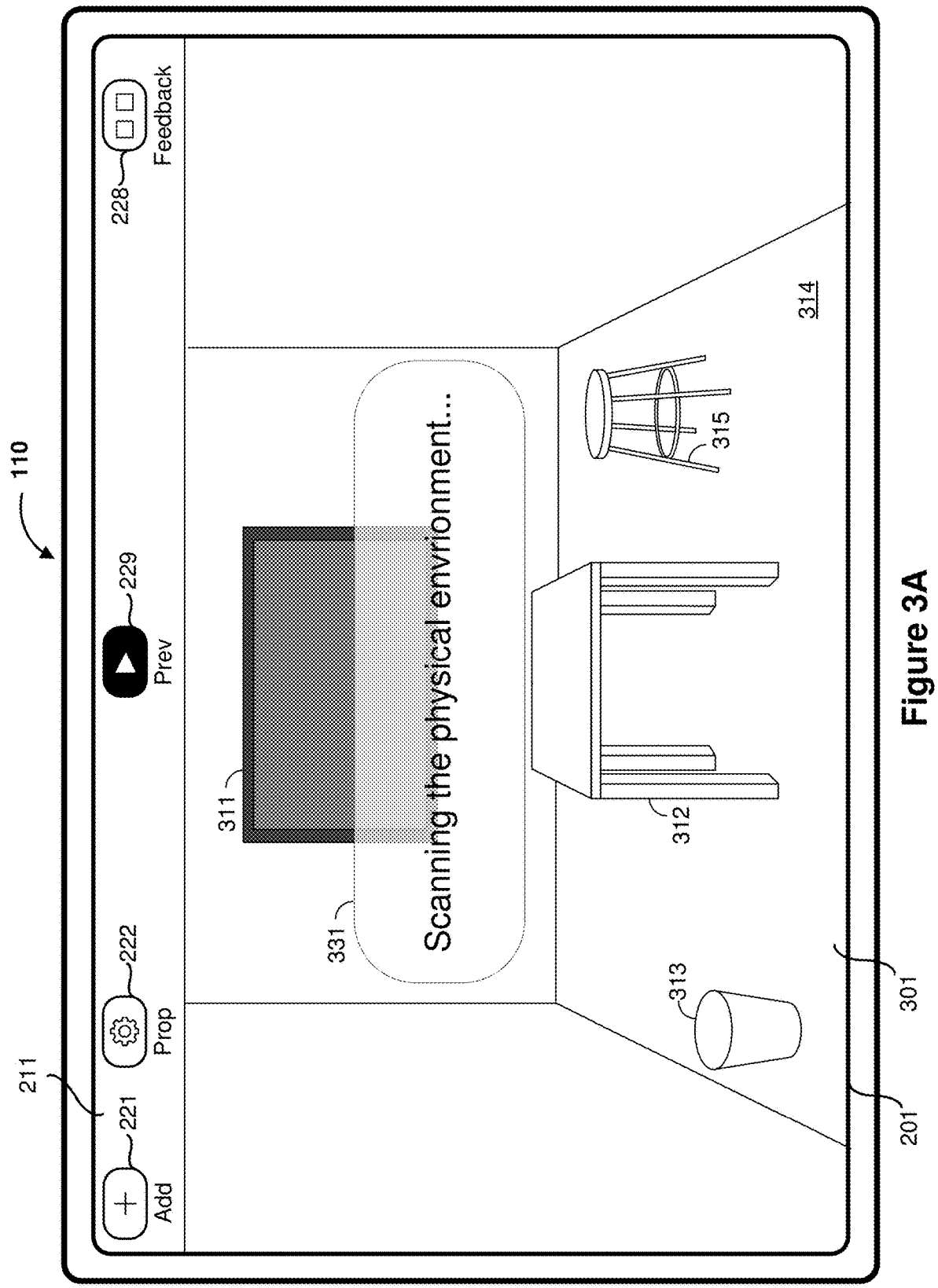
FIGS. 3A-3E illustrate the electronic device of FIG. 1 presenting the scene in a first XR environment based on a first physical environment.

FIG. 3A illustrates the GUI 201 of FIG. 2F in response to detecting a user input directed to the preview affordance 229 while in a first physical environment. In FIG. 3A, the assets region 212 and the view region 213 are replaced with a preview region 301 providing a preview of the scene.

The first physical environment includes a physical television, a physical table, a physical wastebasket, a physical wood floor, and a physical stool. Accordingly, the preview region 301 includes a representation of the first physical environment including a representation of the physical television 311, a representation of the physical table 312, a representation of the physical wastebasket 313, a representation of the physical wood floor 314, and a representation of the physical stool 315.

In providing the preview of the scene, the electronic device 110 scans the first physical environment to determine whether the first physical environment includes physical objects that correspond to the required anchor assets of the scene with the required properties of the anchor assets. While doing so, the electronic device 110 displays a scanning notification 331.

In the first physical environment, the electronic device 110 determines that the physical wood floor corresponds to the anchor floor, that the physical television is blackboard-displayable and corresponds to the anchor vertical plane, that the top of the physical table has the appropriate size and location properties and corresponds to the second anchor horizontal plane, that the physical wastebasket corresponds to the anchor trashcan, and that the physical stool is professor-sittable and corresponds to the first anchor horizontal plane.

Figure 3B:
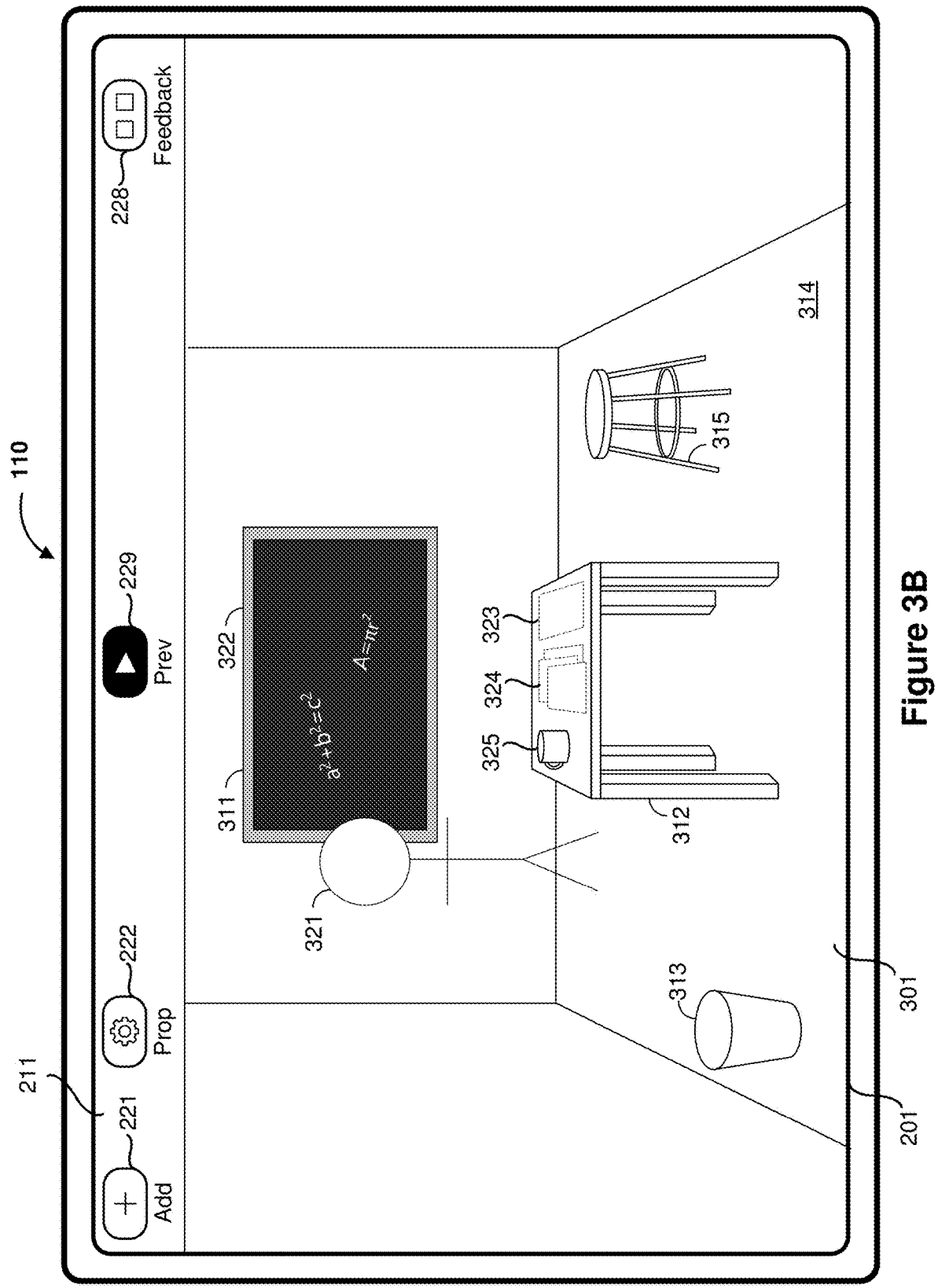

FIG. 3B illustrates the GUI 201 of FIG. 3A in response to determining that the first physical environment includes an object that corresponds to each required anchor asset of the scene with the required properties of the anchor asset.

In executing the scene, the preview region 301 includes a representation of the virtual blackboard 322 displayed over the representation of the physical television 311, a representation of the virtual professor objective-effectuator 321 displayed on the representation of the physical wood floor 314 near the representation of the virtual blackboard 322, a representation of the virtual paper 323 on top of the representation of the physical table 312, a representation of the virtual paper stack 324 on top of the representation of the physical table 312, and a representation of the virtual mug 325 on top of the representation of the physical table 312.

Further, the preview region 301 includes a representation of the first action asset in which the virtual professor objective-effectuator object gives the first speech.

Figure 3C:
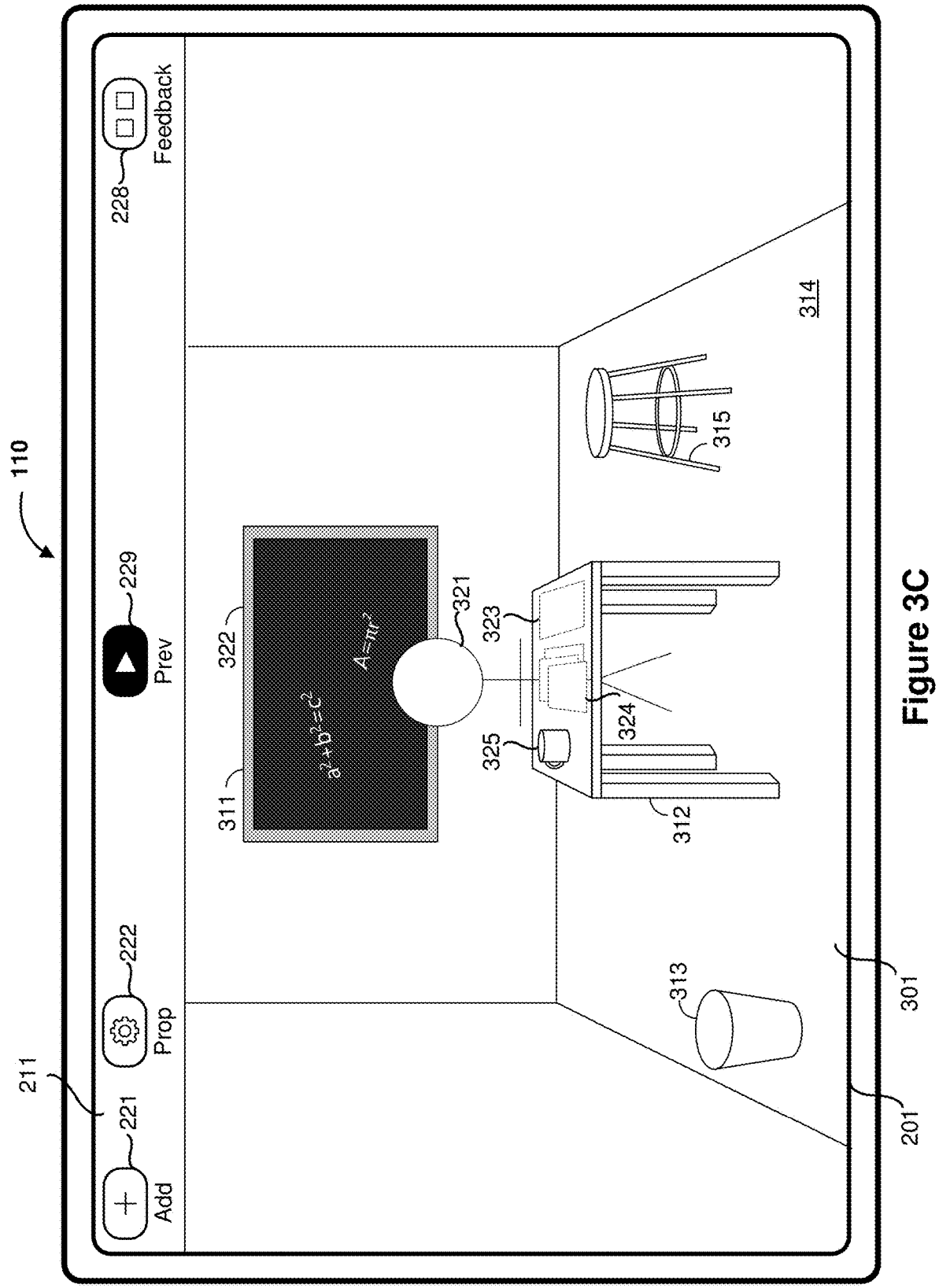

FIG. 3C illustrates the GUI 201 of FIG. 3B in response to the virtual professor objective-effectuator concluding the first speech. In FIG. 3C, the preview region 301 includes a representation of the second action asset in which the virtual professor objective-effectuator moves from near the virtual blackboard to near the virtual paper and a representation of the third action asset in which the virtual professor objective-effectuator gives the second speech. Accordingly, the representation of the virtual professor objective-effectuator 321 is displayed near the representation of the virtual paper 323 rather than near the representation of the virtual blackboard 322.

Figure 3D:
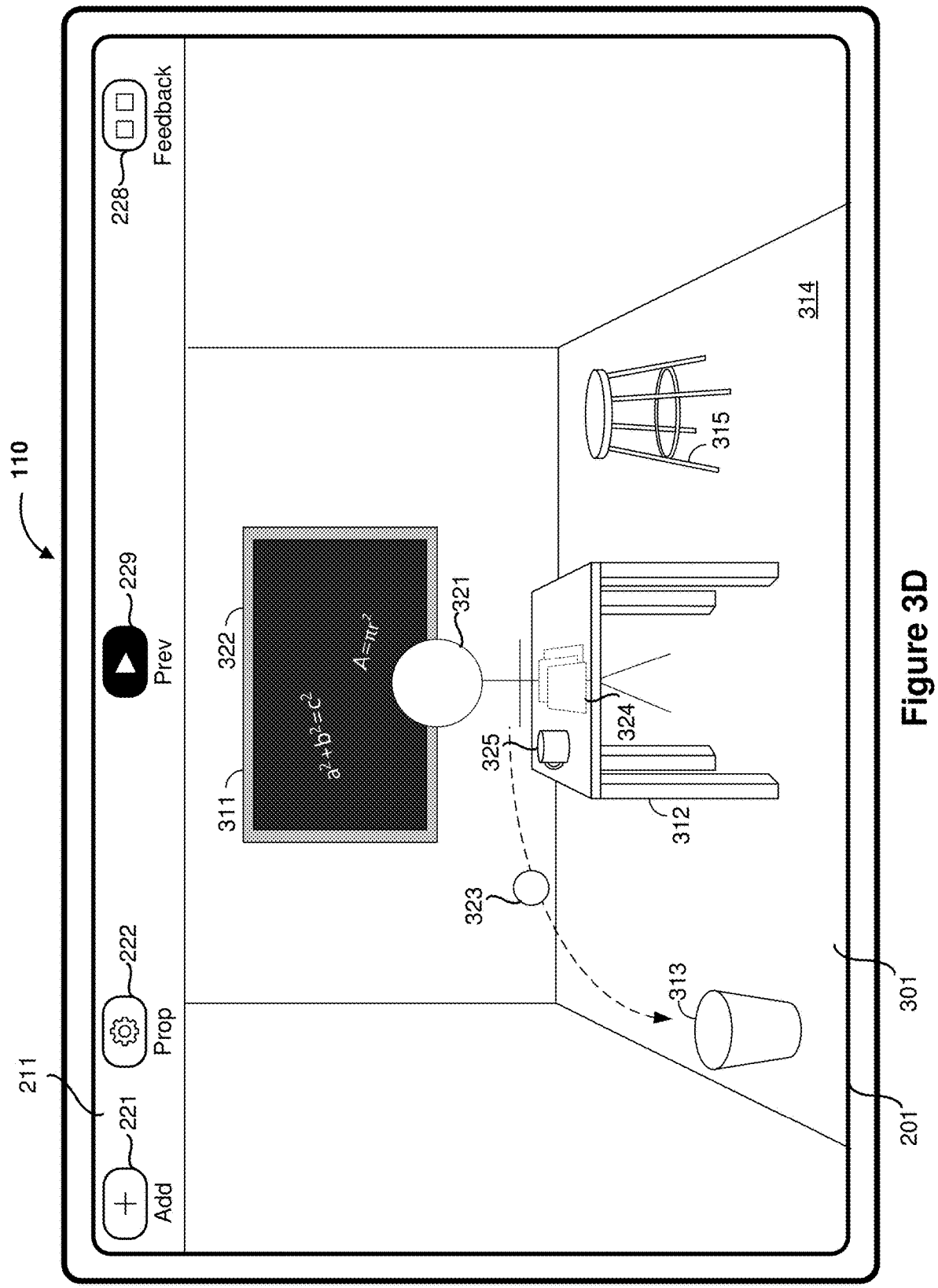

FIG. 3D illustrates the GUI 201 of FIG. 3C in response to the virtual professor objective-effectuator concluding the second speech. In FIG. 3D, the preview region 301 includes a representation of the fourth action asset in which the virtual paper moves from on top of the second anchor horizontal plane to inside the anchor trashcan, if the environment includes an object corresponding to the anchor trashcan, or, if not, on to the anchor floor. Accordingly, the representation of the virtual professor objective-effectuator 321 is displayed throwing the representation of the virtual paper 323 into the representation of the physical wastebasket 313.

Figure 3E:
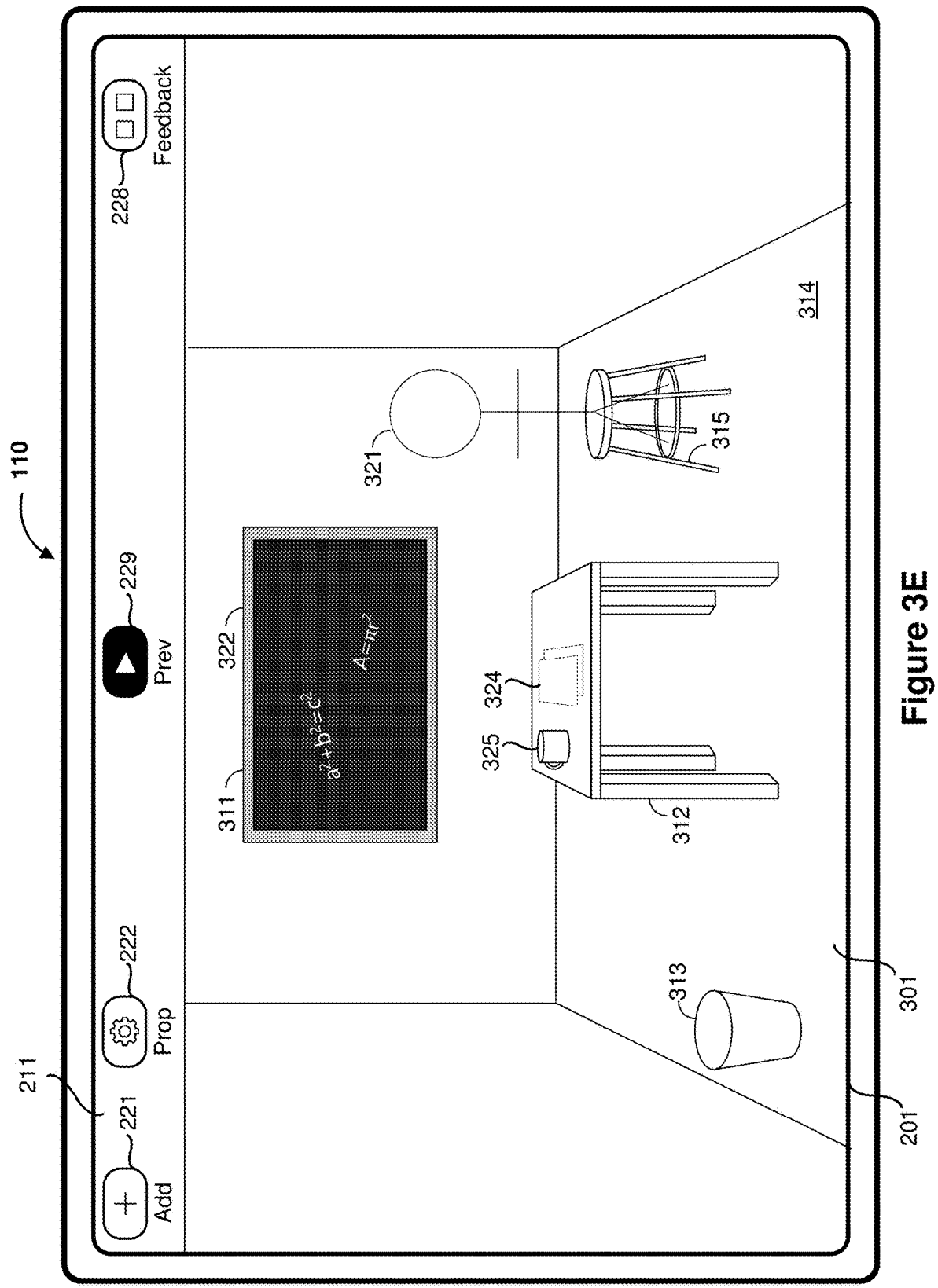

FIG. 3E illustrates the GUI of FIG. 3D in response to the virtual paper being inside the anchor trashcan. In FIG. 3E, the preview region 301 includes a representation of the fifth action asset in which the virtual professor objective-effectuator sits on the first anchor horizontal plane. Accordingly, the representation of the virtual professor objective-effectuator 321 is displayed sitting on the representation of the physical stool 315.

FIGS. 4A-4E illustrate a preview of the scene in a second physical environment in which the electronic device 110 is present. In various implementations, the preview of the scene is displayed in response to the user selecting the preview affordance 229 while in the second physical environment.

Figure 4A:
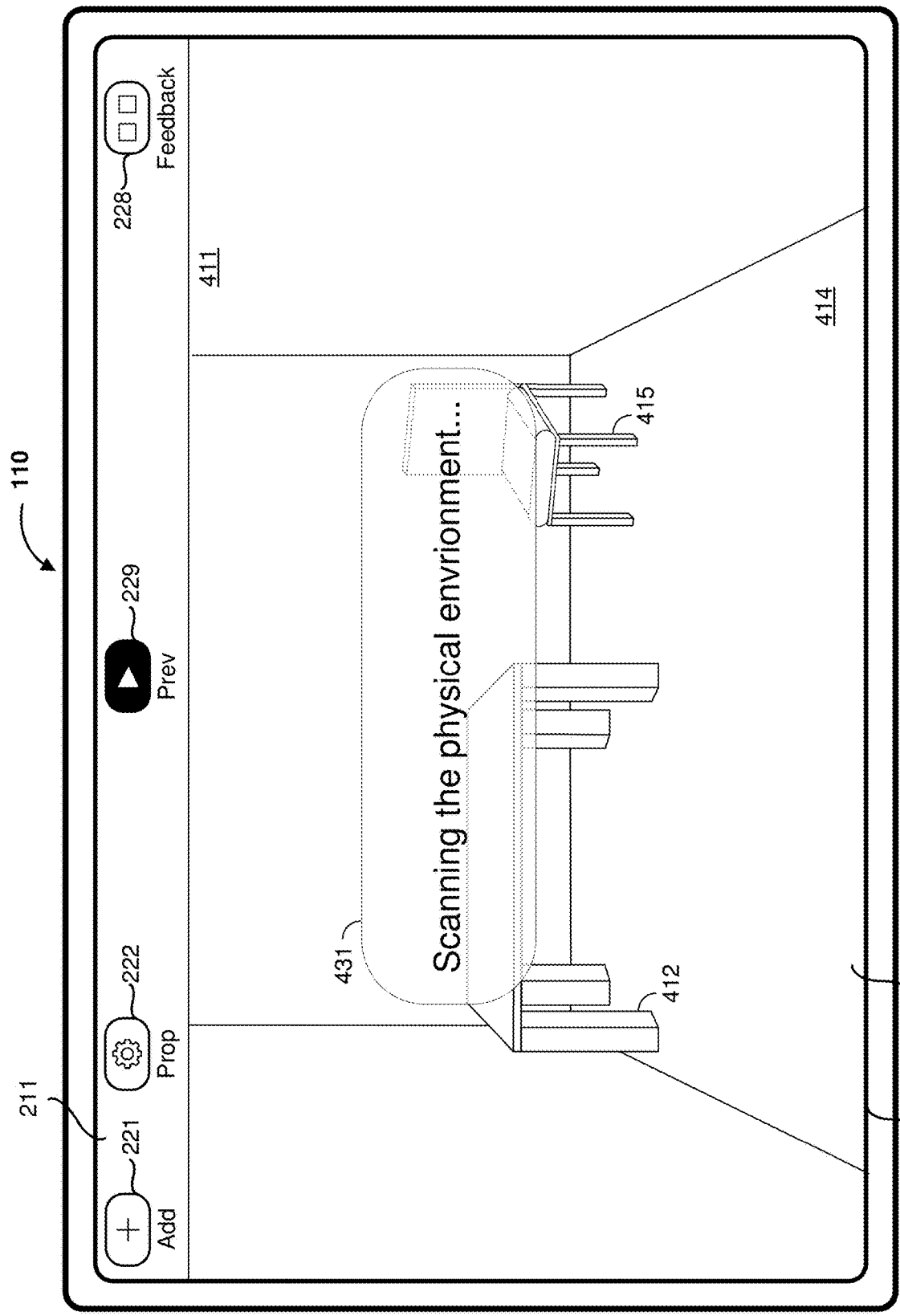
FIGS. 4A-4E illustrate the electronic device of FIG. 1 presenting the scene in a second XR environment based on a second physical environment.

FIG. 4A illustrates the GUI 201 of FIG. 2F in response to detecting a user input directed to the preview affordance 229 while in a second physical environment. In FIG. 4A, the assets region 212 and the view region 213 are replaced with a preview region 401 providing a preview of the scene.

The second physical environment includes a physical wall, a physical desk, a physical tile floor, and a physical chair. Accordingly, the preview region 401 includes a representation of the second physical environment including a representation of the physical wall 411, a representation of the physical desk 412, a representation of the physical tile floor 414, and a representation of the physical chair 415.

In providing the preview of the scene, the electronic device 110 scans the second physical environment to determine whether the second physical environment includes objects that correspond to the required anchor assets of the scene with the required properties of the anchor assets. While doing so, the electronic device 110 displays a scanning notification 431.

In the second physical environment, the electronic device 110 determines that the physical tile floor corresponds to the anchor floor, that the physical wall is blackboard-displayable and corresponds to the anchor vertical plane, that the top of the physical desk has the appropriate size and location properties and corresponds to the second anchor horizontal plane, and that the seat of the physical chair is professor-sittable and corresponds to the first anchor horizontal plane. Further, the electronic device 110 determines that no object in the second physical environment corresponds to the anchor trashcan and that the anchor trashcan is optional.

Figure 4B:
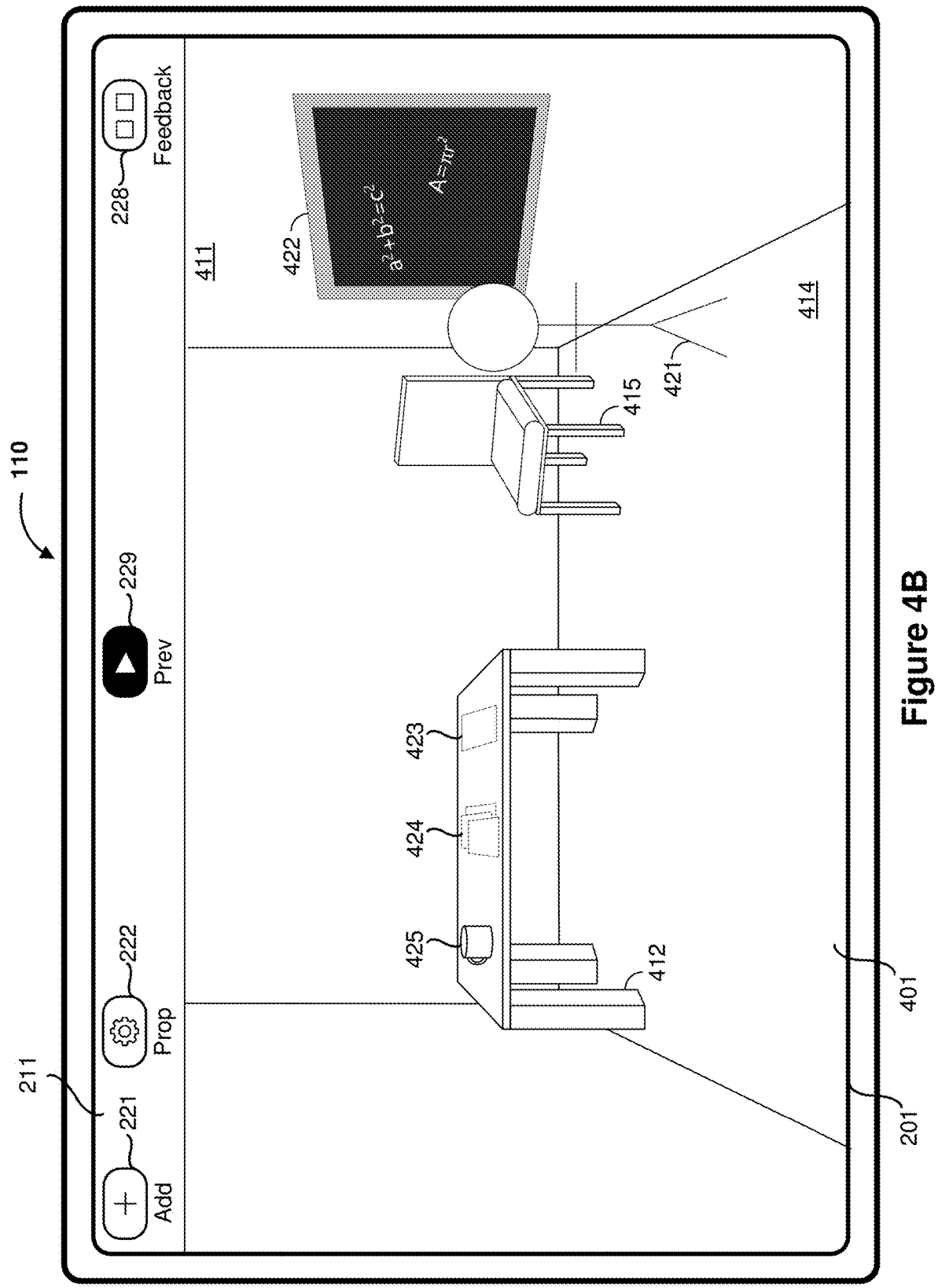

FIG. 4B illustrates the GUI 201 of FIG. 4A in response to determining that the second physical environment includes an object that corresponds to each required anchor asset of the scene with the required properties of the physical asset.

In executing the scene, the preview region 401 includes the representation of the virtual blackboard 422 displayed over the representation of the physical wall 411, the representation of the virtual professor objective-effectuator 421 displayed on the representation of the physical tile floor 414 near the representation of the virtual blackboard 422, a representation of the virtual paper 423 on top of the representation of the physical desk 412, a representation of the virtual paper stack 424 on top of the representation of the physical desk 412, and a representation of the virtual mug 425 on top of the representation of the physical desk 412.

Further, the preview region 401 includes a representation of the first action asset in which the virtual professor objective-effectuator gives the first speech.

Figure 4C:
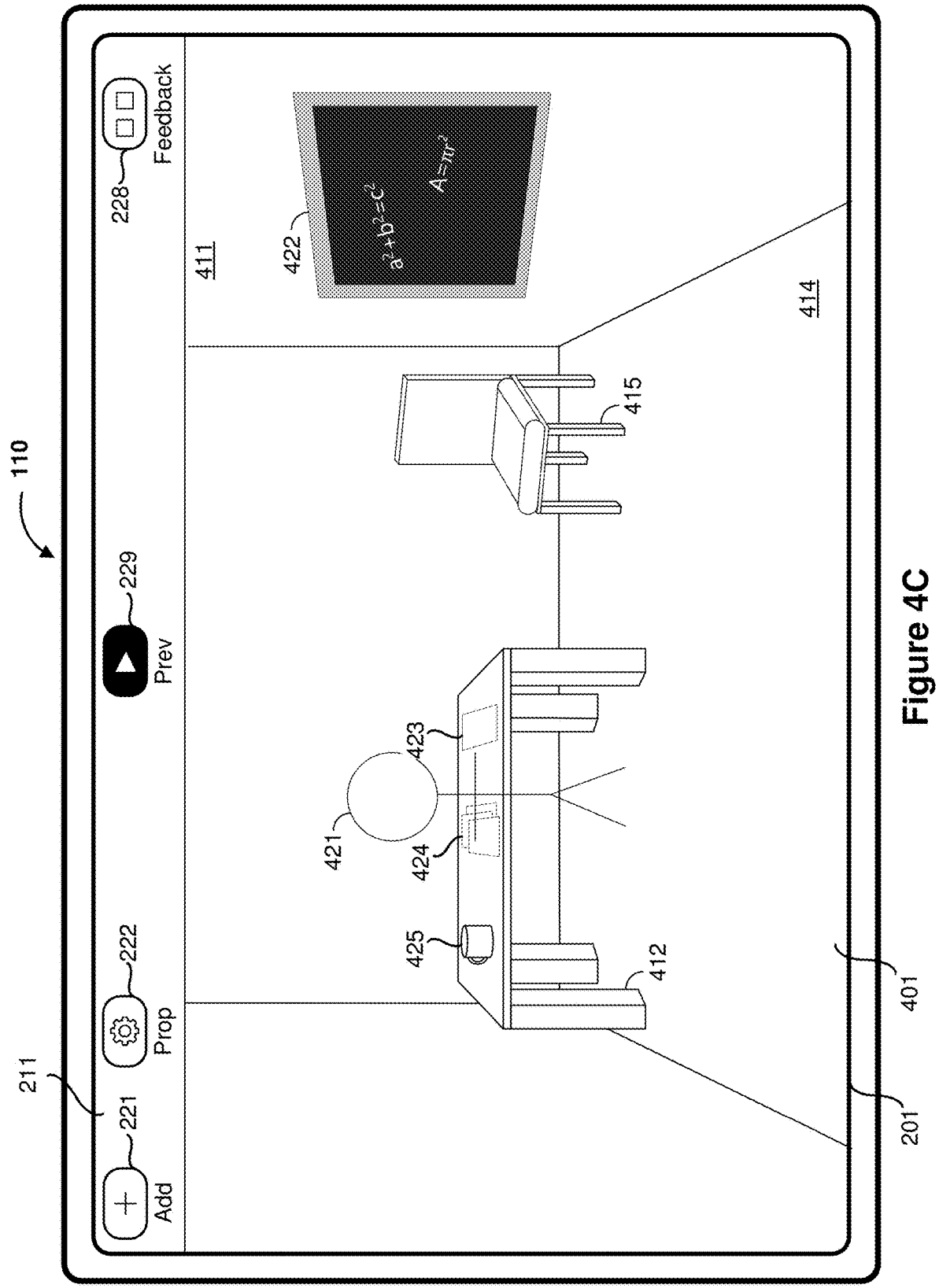

FIG. 4C illustrates the GUI 201 of FIG. 4B in response to the virtual professor objective-effectuator concluding the first speech. In FIG. 4C, the preview region 401 includes a representation of the second action asset in which the virtual professor objective-effectuator moves from near the virtual blackboard to near the virtual paper and a representation of the third action asset in which the virtual professor objective-effectuator gives the second speech. Accordingly, the representation of the virtual professor objective-effectuator 421 is displayed near the representation of the virtual paper 423 rather than near the representation of the virtual blackboard 422.

Figure 4D:
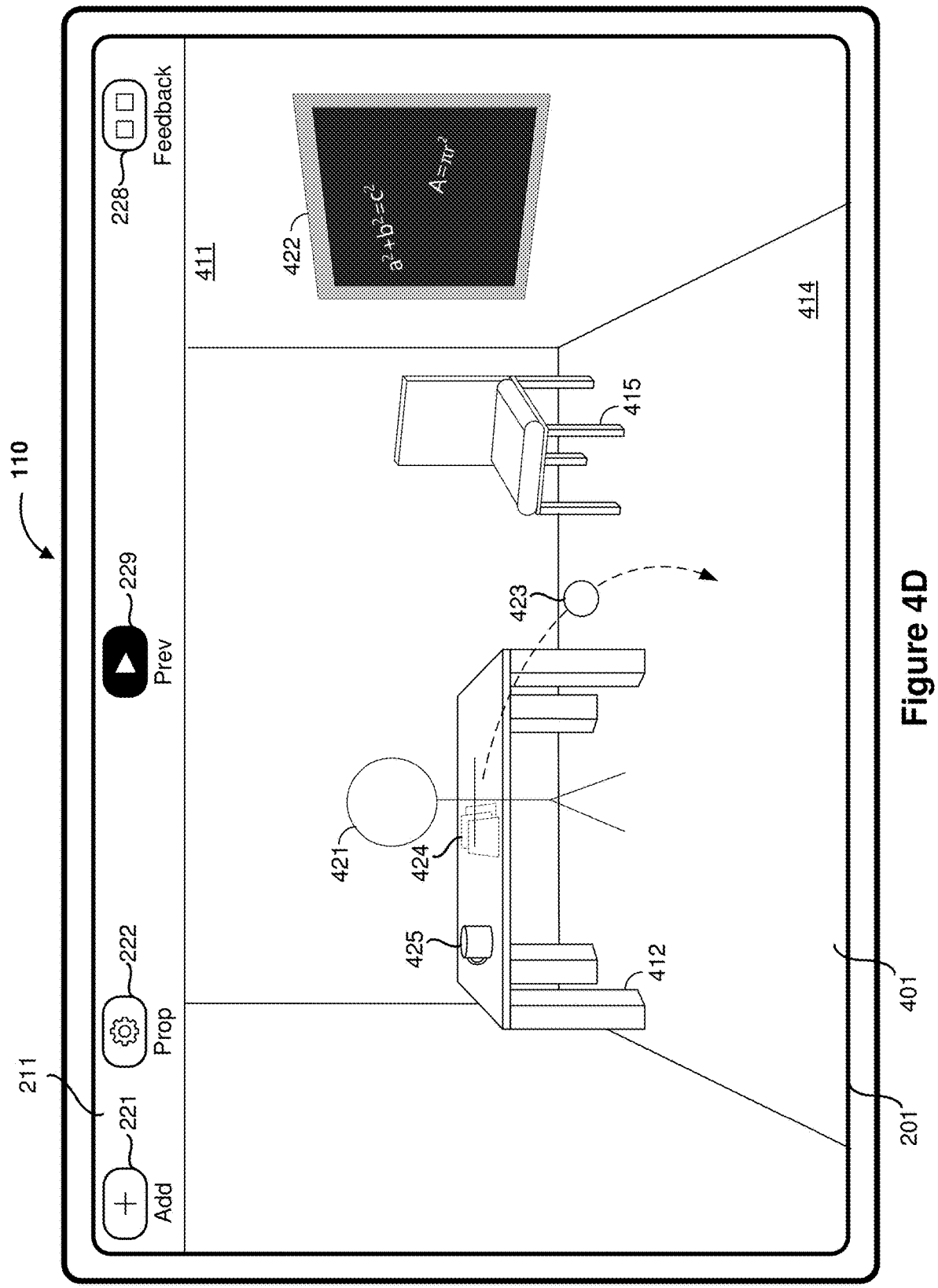

FIG. 4D illustrates the GUI 201 of FIG. 4C in response to the virtual professor objective-effectuator concluding the second speech. In FIG. 4D, the preview region 401 includes a representation of the fourth action asset in which the virtual paper moves from on top of the second anchor horizontal plane to inside the anchor trashcan, if the environment includes an object corresponding to the anchor trashcan, or, if not, on to the anchor floor. Accordingly, the representation of the virtual professor objective-effectuator 421 is displayed throwing the representation of the virtual paper 423 onto the representation of the physical tile floor 414.

Figure 4E:
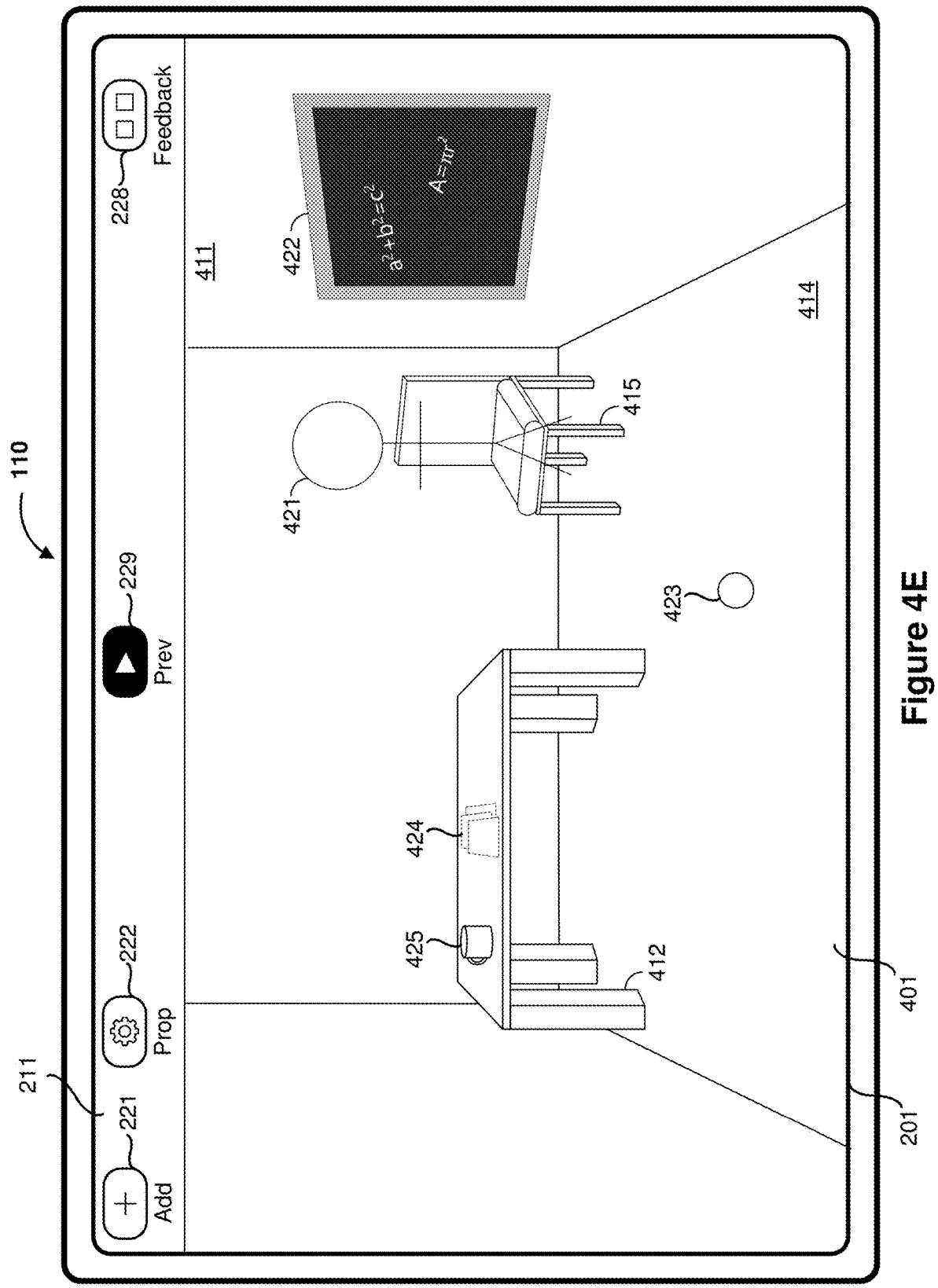

FIG. 4E illustrates the GUI of FIG. 4D in response to the virtual paper being on top of the anchor floor. In FIG. 4E, the preview region 401 includes a representation of the fifth action asset in which the virtual professor objective-effectuator object sits on the first anchor horizontal plane. Accordingly, the representation of the virtual professor objective-effectuator 421 is displayed sitting on the representation of the physical chair 415.

Figure 5A:
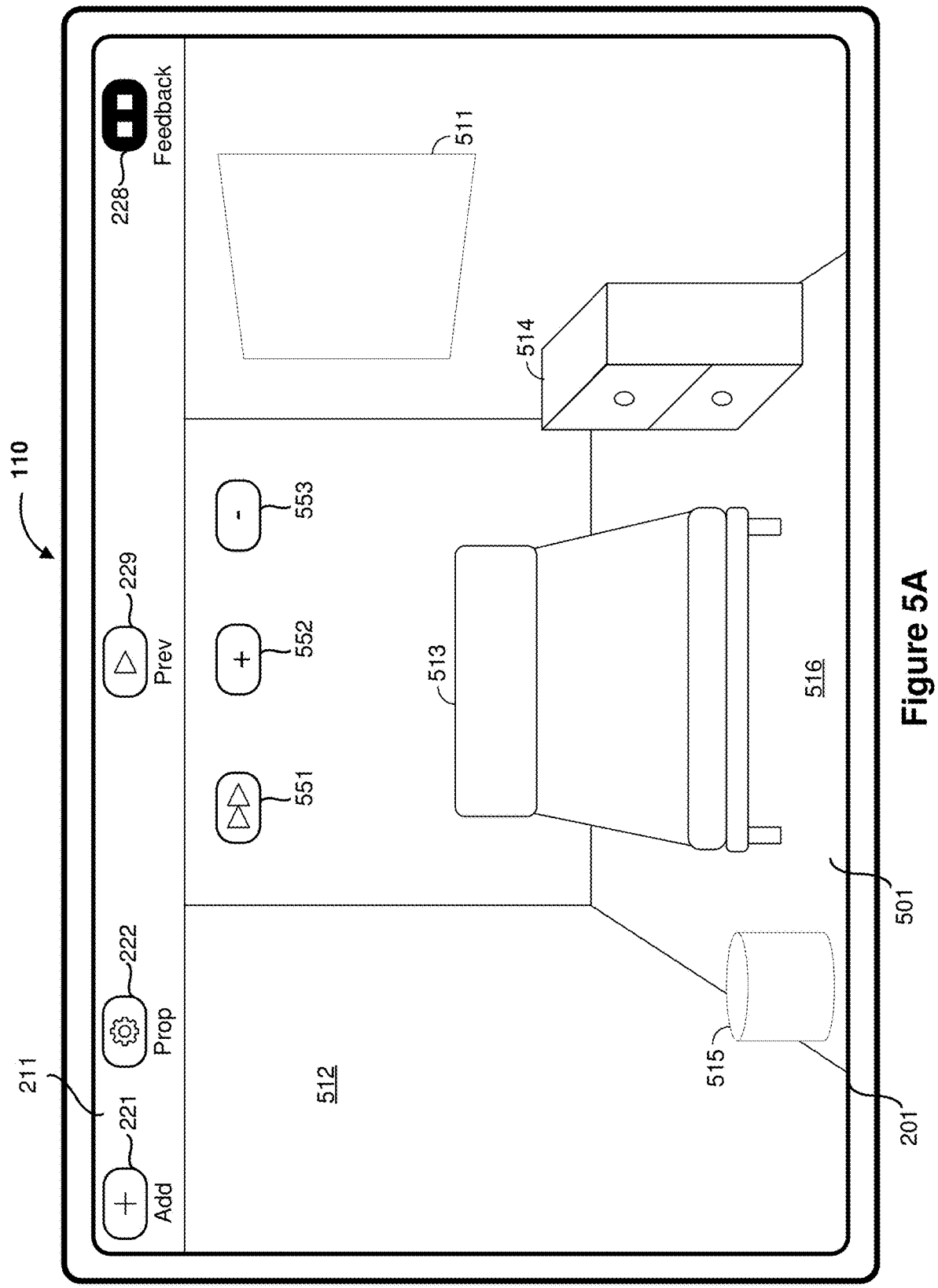
FIGS. 5A-5C illustrate the electronic device of FIG. 1 presenting a preview of the scene in a first virtual environment.
Figure 5B:
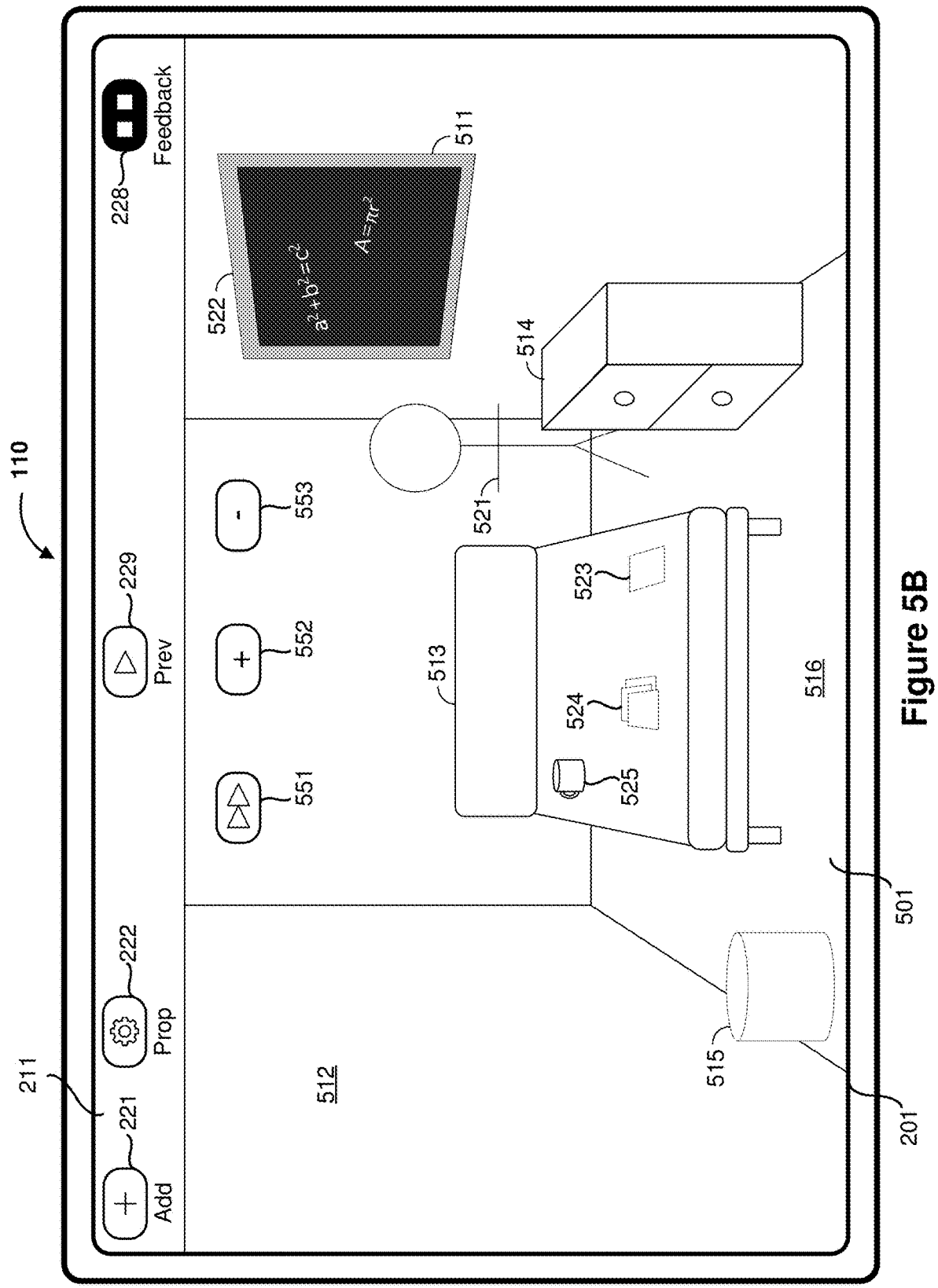
Figure 5C:
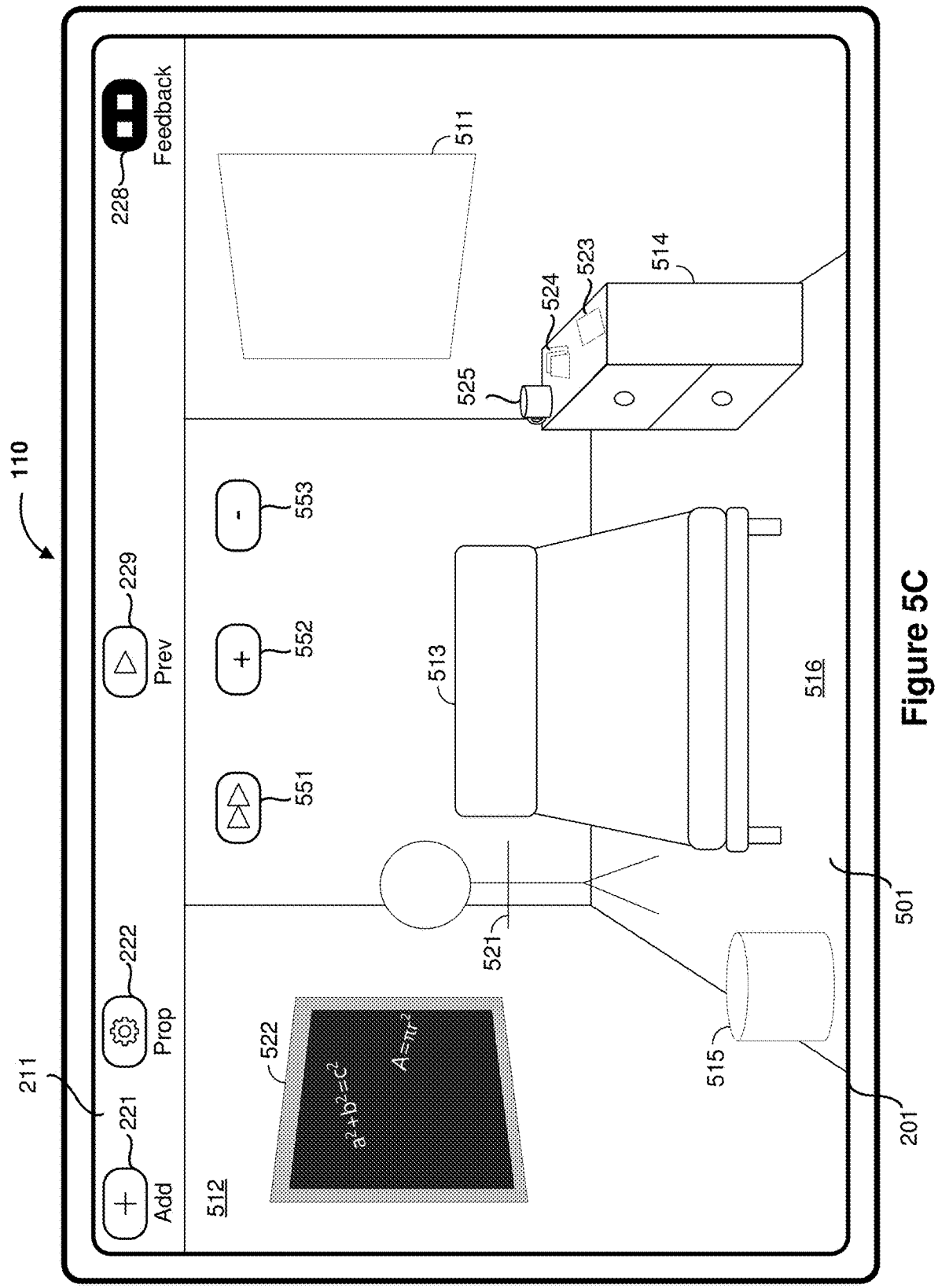

FIGS. 5A-5C illustrate a preview of the scene in a first virtual environment. In various implementations, the preview of the scene is displayed in response to the user selecting the feedback affordance 228. Unlike the previews of FIGS. 3A-3E or FIGS. 4A-4E, the preview of FIGS. 5A-5C is displayed in a virtual environment rather than a physical environment. In various implementations, the first virtual environment is based on a physical environment remote from the electronic device, e.g., a physical environment in which the electronic device 110 is not present. In various implementations, the first virtual environment is selected from a database of virtual environments. In particular, in various implementations, the first virtual environment is selected from those of the virtual environments in the database that include an object that corresponds to each required anchor asset of the scene with the required properties of the anchor asset. In various implementations, the first virtual environment is generated by the electronic device 110 to have an object that corresponds to each required anchor asset of the scene with the required properties of the anchor asset. In various implementations, the first virtual environment is generated by the electronic device 110 by modifying a virtual environment to have an object that corresponds to each required anchor asset of the scene with the required properties of the anchor asset.

FIG. 5A illustrates the GUI 201 of FIG. 2F in response to detecting a user input directed to the feedback affordance 228. In FIG. 5A, the assets region 212 and the view region 213 are replaced with a preview region 501 providing a preview of the scene.

The first virtual environment includes a virtual mirror, a virtual wall, a virtual bed, a virtual dresser, a virtual ottoman, and a virtual carpet floor. Accordingly, the preview region 501 includes a representation of the first virtual environment including a representation of the virtual mirror 511, a representation of the virtual wall 512, a representation of the virtual bed 513, a representation of the virtual dresser 514, a representation of the virtual ottoman 515, and a representation of the virtual carpet floor 516.

Because the first virtual environment is selected or generated to include an object that corresponds to each required anchor asset of the scene with the required properties of the anchor asset, the electronic device 110 does not need to scan or analyze the first virtual environment to determine if this is true. In various implementations, the electronic device 110 determines correspondence between the objects of the first virtual environment and the anchor assets during selection or generation of the first virtual environment. In the first virtual environment, the electronic device 110 determines that the virtual carpet floor corresponds to the anchor floor, that the virtual mirror is blackboard-displayable and corresponds to the anchor vertical plane, that the virtual bed has the appropriate size and location properties and corresponds to the second anchor horizontal plane, and that the virtual ottoman is professor-sittable and corresponds to the first anchor horizontal plane.

In various implementations, the preview region 501 initially includes the first virtual environment without the virtual assets to allow a user to assess the first virtual environment without objects occluded by virtual assets (such as the virtual mirror being occluded by the virtual blackboard object). In various implementations, the virtual assets are displayed after the first virtual environment has been displayed for a time period. In various implementations, the virtual assets are displayed in response to a user input.

The preview region 501 includes a skip affordance 551 and a set of feedback affordance including a positive affordance 552 and a negative affordance 553. In response to user selection of the skip affordance 551, the electronic device 110 displays a preview of the scene in a second virtual environment.

In response to user selection of the positive affordance 552 or negative affordance 553, the electronic device 110 generates user feedback regarding the preview of the scene. Based on the user feedback and, in various implementations, other user feedback received during the display of other previews, the electronic device 110 modifies the scene. For example, in various implementations, the electronic device 110 adds a property to a virtual asset or a physical asset. In various implementations, the property may be an optional property or a required property. In various implementations, the positive affordance 552 and negative affordance 553 may be referred to as a thumbs-up affordance and thumbs-down affordance or a like affordance and dislike affordance.

FIG. 5B illustrates the GUI 201 of FIG. 5A after the time period or detection of the user input. In executing the scene, the preview region 501 includes a representation of the virtual blackboard 522 displayed over the representation of the virtual mirror 511, a representation of the virtual professor objective-effectuator 521 displayed on the representation of the virtual carpet floor 514 near the representation of the virtual blackboard 522, and a representation of the virtual paper 523, a representation of the virtual paper stack 524, and representation of the virtual mug 525 on top of the representation of the virtual bed 513.

In various implementations, viewing the preview may prompt a user to manually add properties to virtual assets or physical assets of the scene. For example, in response to viewing the preview, the user adds additional properties to the second anchor horizontal plane limiting its width value and length value. Further, the user adds an additional property to the virtual blackboard that it be displayed on a non-reflective, non-transparent surface.

FIG. 5C illustrates the GUI 201 of FIG. 5B in response to the user adding the additional properties to the scene. Accordingly, the virtual bed no longer corresponds to the second anchor horizontal plane, but the virtual dresser does. Further, the virtual mirror no longer corresponds to the anchor vertical plane, but the virtual wall does. Thus, in FIG. 5C, the representation of the virtual paper 523, the representation of the virtual paper stack 524, and the representation of the virtual mug 525 are displayed on top of the representation of the virtual dresser 514. Further, the representation of the virtual blackboard 522 is displayed on the representation of the virtual wall 512 and the representation of the virtual professor objective-effectuator 521 is moved near the new location of the virtual blackboard 522.

In various implementations, if the first virtual environment does not include an object that corresponds to each required anchor asset of the scene with the additional required properties of the anchor asset, the electronic device 110 modifies the first virtual environment such that it does.

FIGS. 6A-6D illustrate a preview of the scene in a second virtual environment. In various implementations, the preview of the scene is displayed in response to the user selecting the skip affordance 551, the positive affordance 552, or the negative affordance 553.

Figure 6A:
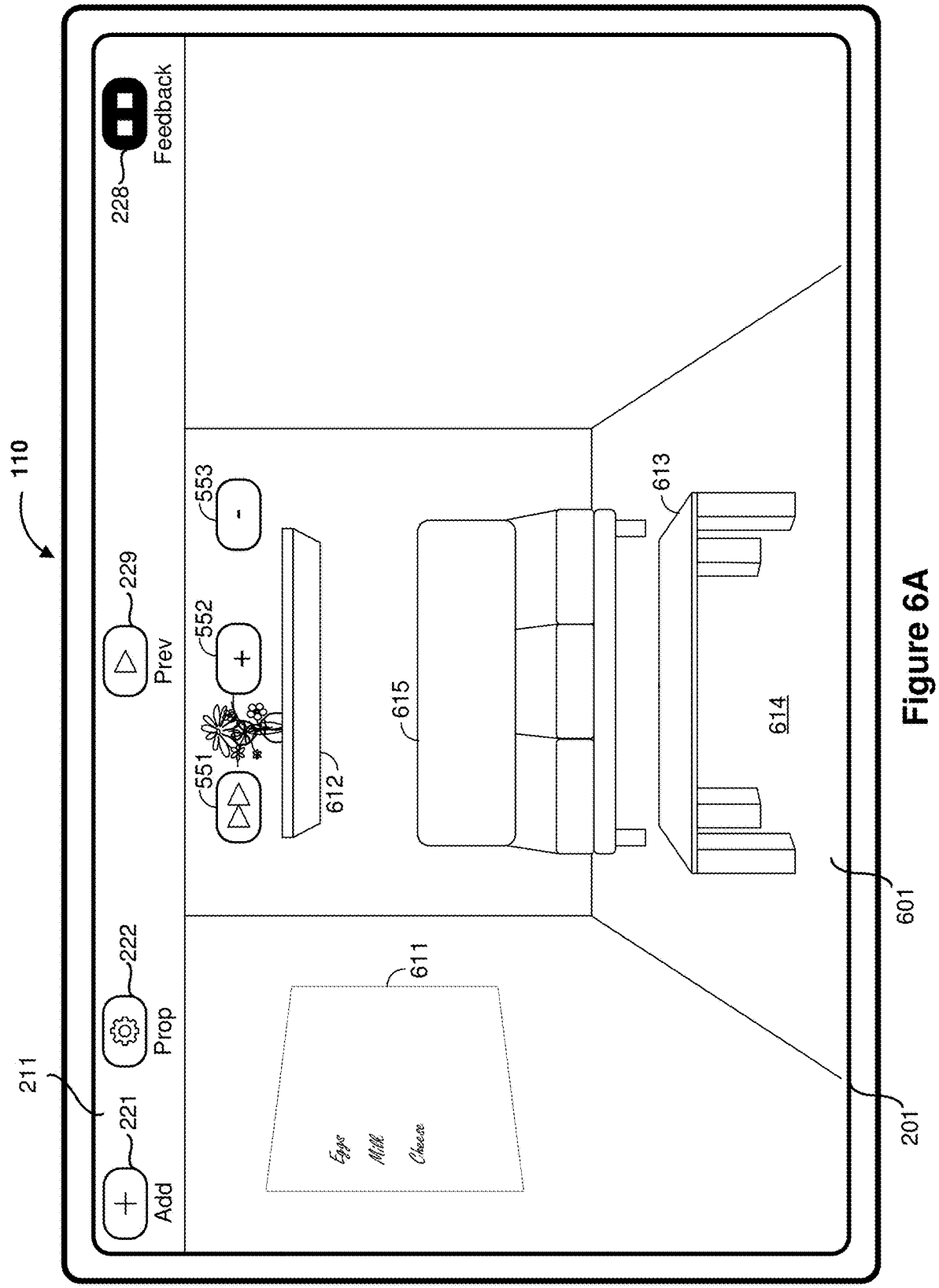
FIGS. 6A-6D illustrate the electronic device of FIG. 1 presenting a preview of the scene in a second virtual environment.

FIG. 6A illustrates the GUI 201 of FIG. 5C in response to detecting a user input directed to the positive affordance 552. In FIG. 6A, the preview region 501 is replaced with a preview region 601 providing a preview of the scene. In response to user selection of the skip affordance 551, the electronic device 110 displays a preview of the scene in a third virtual environment.

The second virtual environment includes a virtual whiteboard, a virtual shelf, a virtual coffee table, a virtual stone floor, and a virtual couch. Accordingly, the preview region 601 includes a representation of the second virtual environment including a representation of the virtual whiteboard 611, a representation of the virtual shelf 612, a representation of the virtual coffee table 613, a representation of the virtual stone floor 614, and a representation of the virtual couch 615.

In various implementations, the electronic device 110 determines correspondence between the objects of the second virtual environment and the anchor assets during selection or generation of the second virtual environment. In the second virtual environment, the electronic device 110 determines that the virtual stone floor corresponds to the anchor floor, that the virtual whiteboard is blackboard-displayable and corresponds to the anchor vertical plane, that the virtual shelf has the appropriate size and location properties and corresponds to the second anchor horizontal plane, and that the virtual couch is professor-sittable and corresponds to the first anchor horizontal plane.

In various implementations, the preview region 601 initially includes the second virtual environment without the virtual assets to allow a user to assess the second virtual environment without objects occluded by virtual assets (such as the whiteboard being occluded by the virtual blackboard). In various implementations, the virtual assets are displayed after the second virtual environment has been displayed for a time period. In various implementations, the virtual assets are displayed in response to a user input.

Figure 6B:
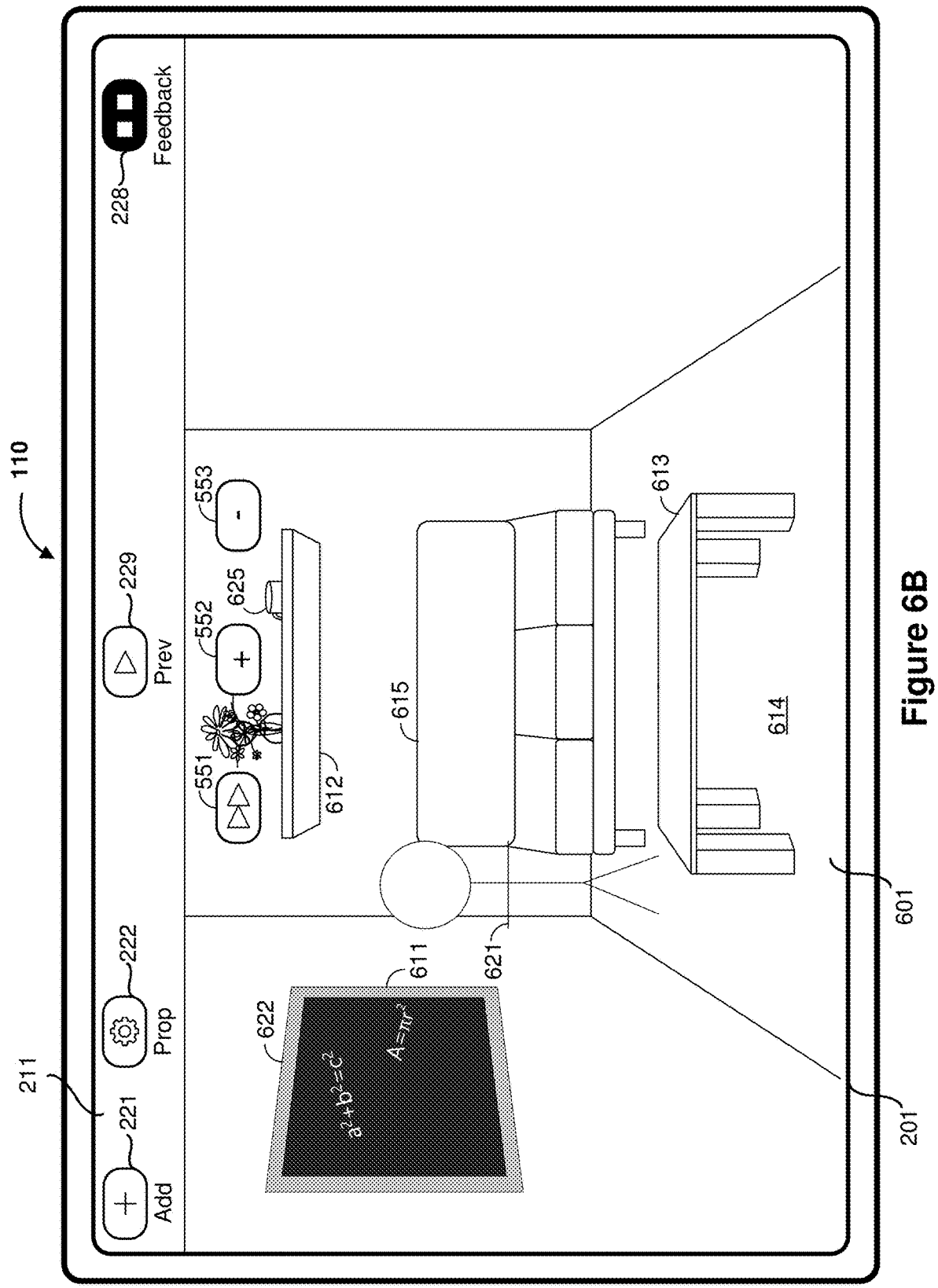

FIG. 6B illustrates the GUI 201 of FIG. 6A after the time period or detection of the user input. In executing the scene, the preview region 601 includes a representation of the virtual blackboard 622 displayed over the representation of the virtual whiteboard 611, a representation of the virtual professor objective-effectuator 621 displayed on the representation of the virtual stone floor 614 near the representation of the virtual blackboard 622, and a representation of the virtual mug 625 on top of the representation of the virtual shelf 612. Notably, the preview region 601 does not include a representation of the virtual paper or a representation of the virtual paper stack, which would be visible on top of the representation of the shelf 612 when viewed from a different perspective.

Figure 6C:
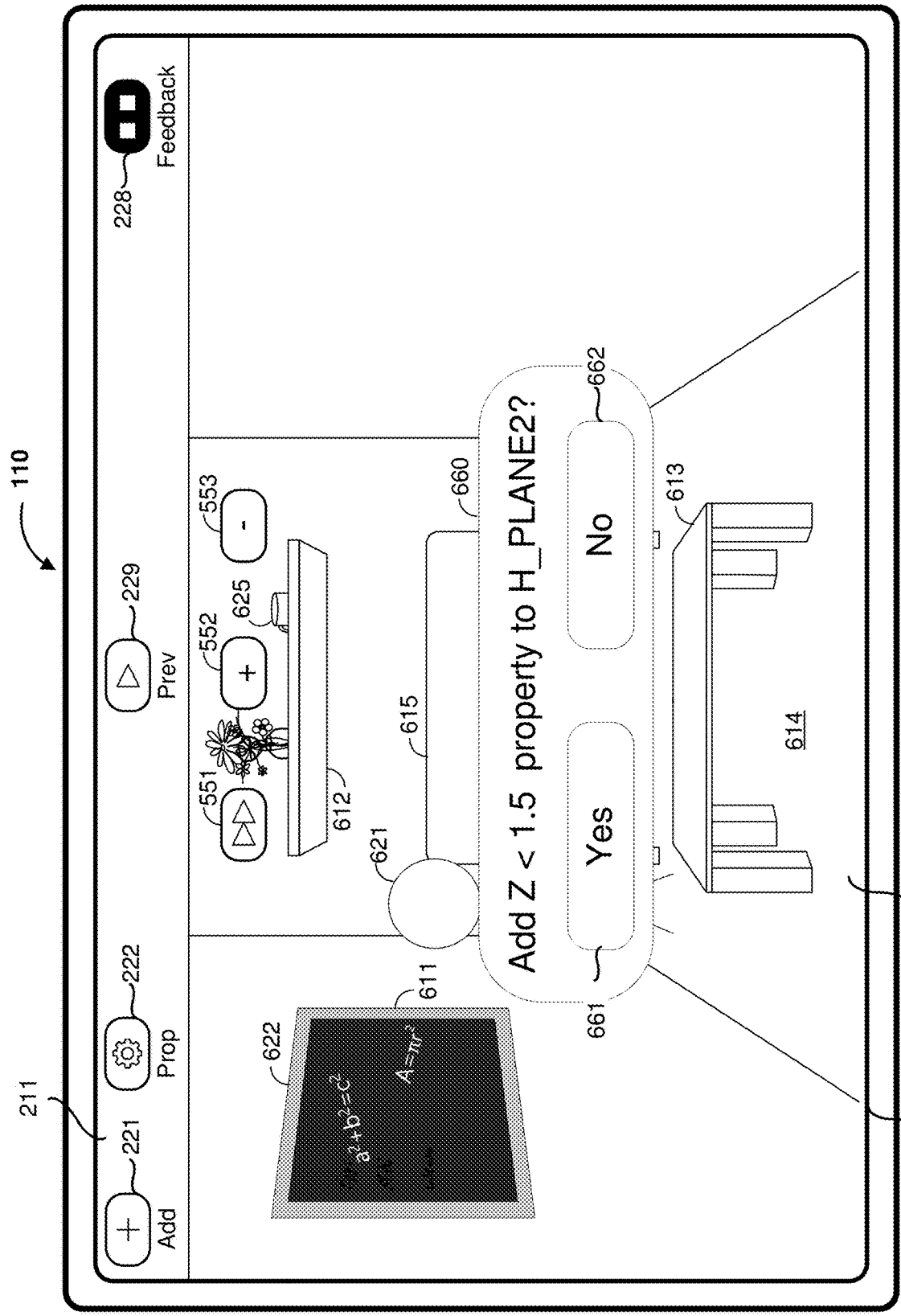

FIG. 6C illustrates the GUI 201 of FIG. 6B in response to detecting user selection of the negative affordance 553. Based on the received feedback, the preview region 601 includes a property suggestion window 660 that includes an accept affordance 661 and a decline affordance 662. The property suggestion window 660 includes an indication of a suggested property to add to the second anchor horizontal plane of having a height value less than 1.5 meters.

Figure 6D:
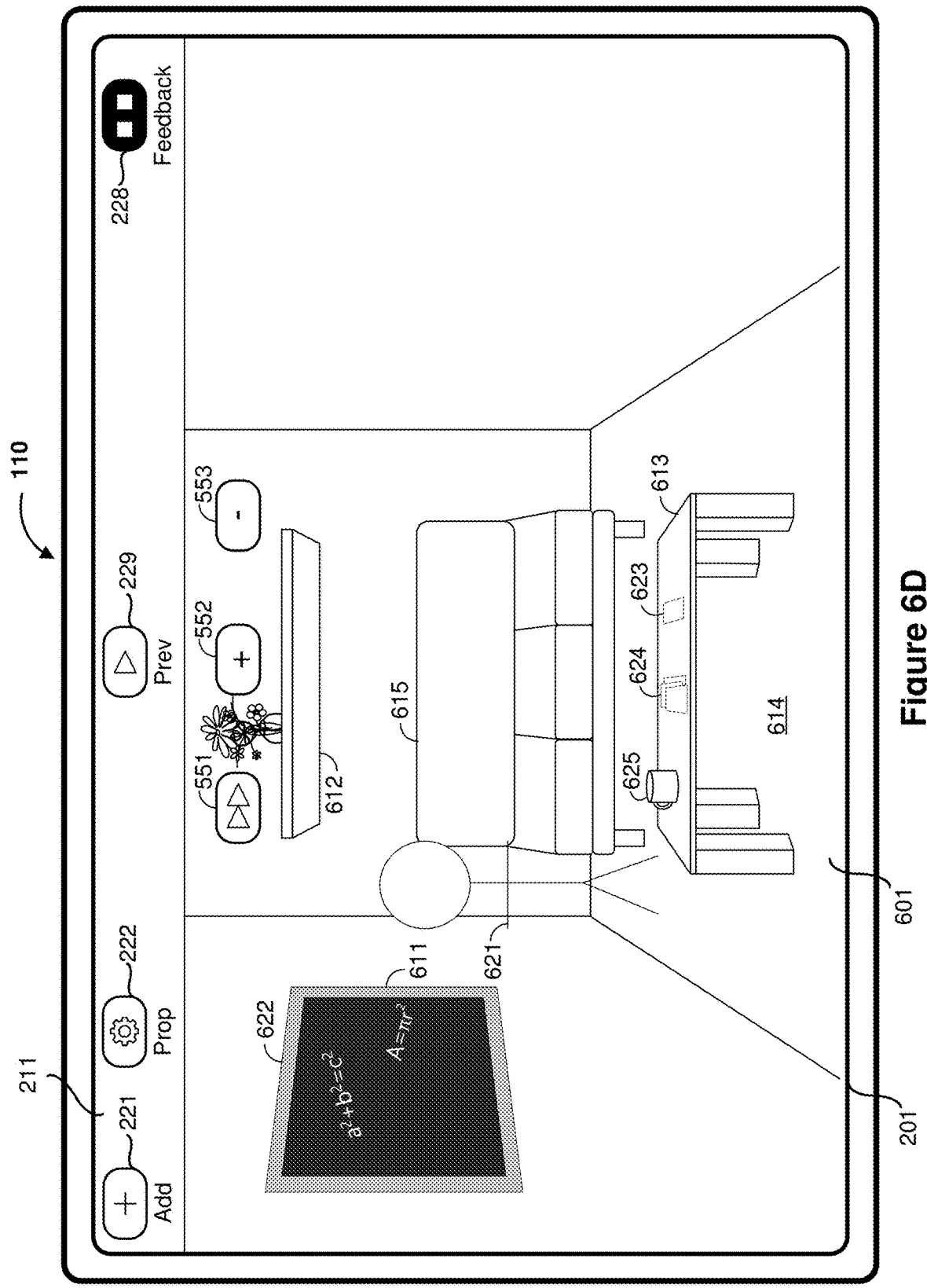

FIG. 6D illustrates the GUI 201 of FIG. 6C in response to detecting user selection of the accept affordance 661. In response to selection of the accept affordance 661, the electronic device 110 adds the suggested property to the second anchor horizontal plane. Accordingly, the virtual shelf no longer corresponds to the second anchor horizontal plane, but the virtual coffee table does. Thus, in FIG. 6D, the representation of the virtual mug 625 is displayed on top of the representation of the virtual coffee table 613. Further, a representation of the virtual paper 623 and a representation of the virtual paper stack 624 are displayed on top of the representation of the virtual coffee table 613.

Whereas, in various implementations, the electronic device 110 suggests properties to add to virtual assets or physical assets of the scene, in various implementations, the electronic device 110 automatically adds properties to virtual assets or physical assets in the scene without additional user input beyond the user feedback.

Figure 7A:
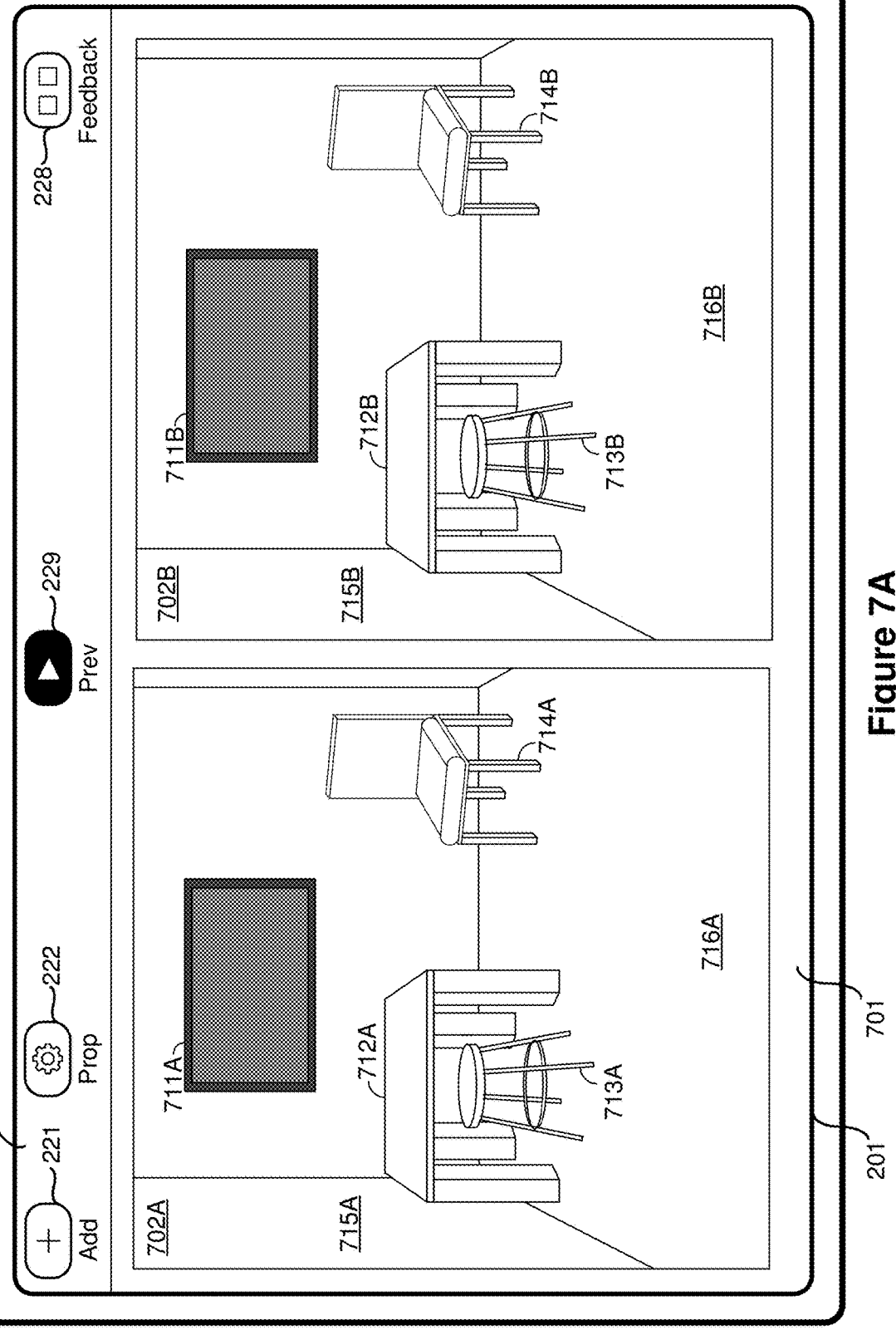
FIGS. 7A-7C illustrate the electronic device of FIG. 1 presenting the side-by-side previews of the scene in a third virtual environment.
Figure 7B:
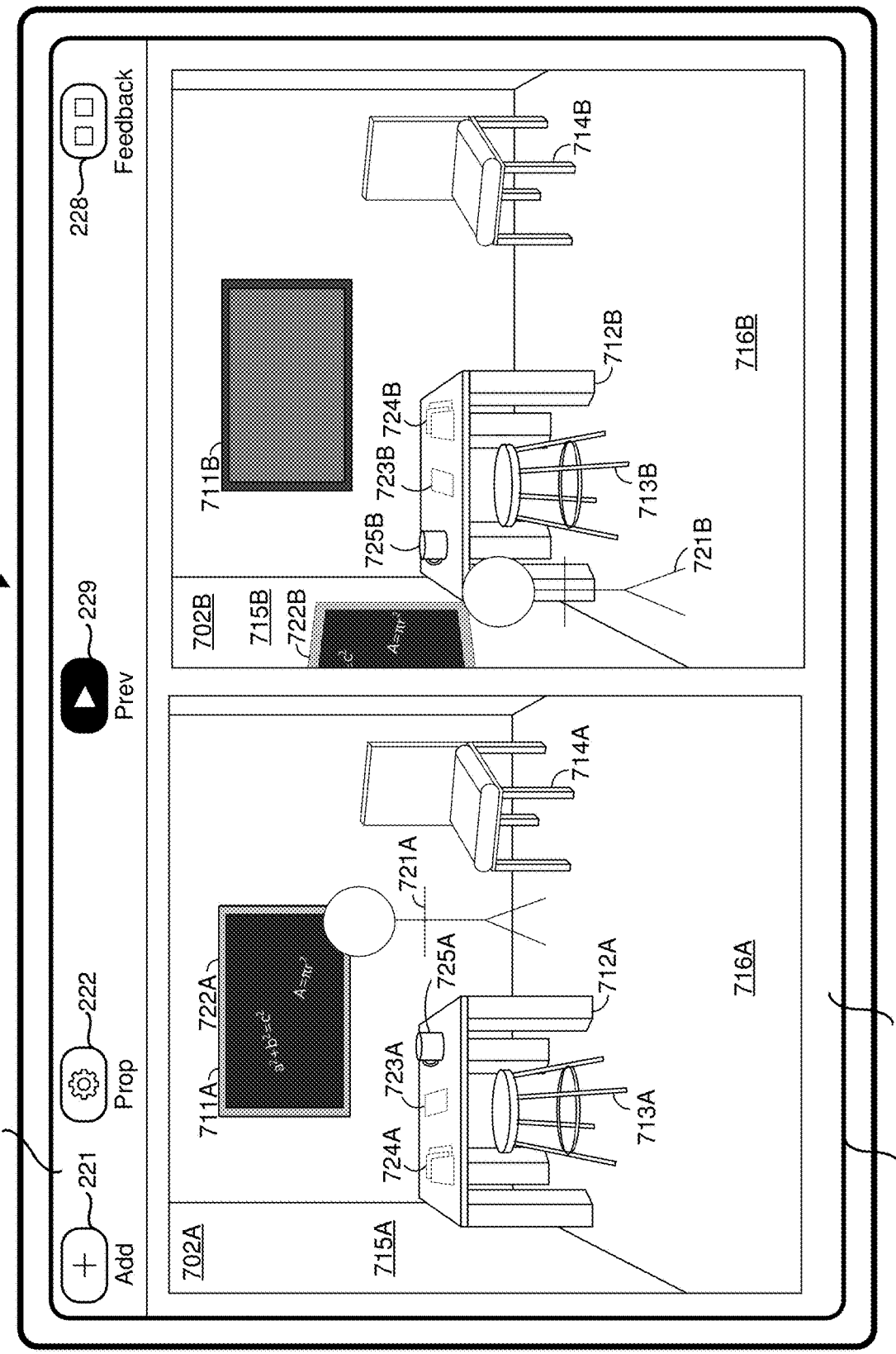

FIGS. 7A-7B illustrate two side-by-side previews of the scene in a third virtual environment. In various implementations, the side-by-side previews are displayed in response to the user selecting the feedback affordance 228.

FIG. 7A illustrates the GUI 201 of FIG. 2F in response to detecting a user input directed to the feedback affordance 228. In FIG. 7A, the assets region 212 and the view region 213 are replaced with a preview region 701 providing the side-by-side previews of the scene including a first preview sub-region 702A providing a first preview of the scene in the third environment and a second preview sub-region 702B providing a second preview of the scene in the third environment.

The third virtual environment includes a virtual television, a virtual table, a virtual stool, a virtual chair, a virtual wall, and a virtual floor. Accordingly, the first preview sub-region 702A includes a representation of the third virtual environment including a representation of the virtual television 711A, a representation of the virtual table 712A, a representation of the virtual stool 713A, a representation of the virtual chair 714A, a representation of the virtual wall 715A, and a representation of the virtual floor 716A. Further, the second preview sub-region 702B includes a representation of the third virtual environment including a representation of the virtual television 711B, a representation of the virtual table 712B, a representation of the virtual stool 713B, a representation of the virtual chair 714B, a representation of the virtual wall 715B, and a representation of the virtual floor 716B.

In various implementations, the electronic device 110 determines correspondence between the objects of the third virtual environment and the anchor assets during selection or generation of the third virtual environment. In the third virtual environment, the electronic device 110 determines that the virtual floor corresponds to the anchor floor, that the virtual television and the virtual wall are blackboard-displayable and may each correspond to the anchor vertical plane, that the virtual table has the appropriate size and location properties and corresponds to the second anchor horizontal plane, and that the virtual stool and the virtual chair are professor-sittable and may each correspond to the first anchor horizontal plane.

In various implementations, the first preview sub-region 702A and second preview sub-region 702B initially includes the third virtual environment without the virtual assets to allow a user to assess the third virtual environment without objects occluded by virtual assets (such as the virtual television being occluded by the virtual blackboard). In various implementations, the virtual assets are displayed after the third virtual environment has been displayed for a time period. In various implementations, the virtual assets are displayed in response to a user input.

FIG. 7B illustrates the GUI 201 of FIG. 7A after the time period or detection of the user input. In executing the scene, the first preview sub-region 702A includes a representation of the virtual blackboard 722A displayed over the representation of the virtual television 711A, a representation of the virtual professor objective-effectuator 721A displayed on the representation of the virtual floor 716A near the representation of the virtual blackboard 722A, and a representation of the virtual paper 723A, a representation of the virtual paper stack 724A, and a representation of the virtual mug 725A on top of the representation of the virtual table 712A.

In executing the scene, the second preview sub-region 702B includes a representation of the virtual blackboard 722B displayed over the representation of the virtual wall 715B, a representation of the virtual professor objective-effectuator 721B displayed on the representation of the virtual floor 716B near the representation of the virtual blackboard 722B, and a representation of the virtual paper 723B, a representation of the virtual paper stack 724B, and a representation of the virtual mug 725B on top of the representation of the virtual table 712B.

Figure 7C:
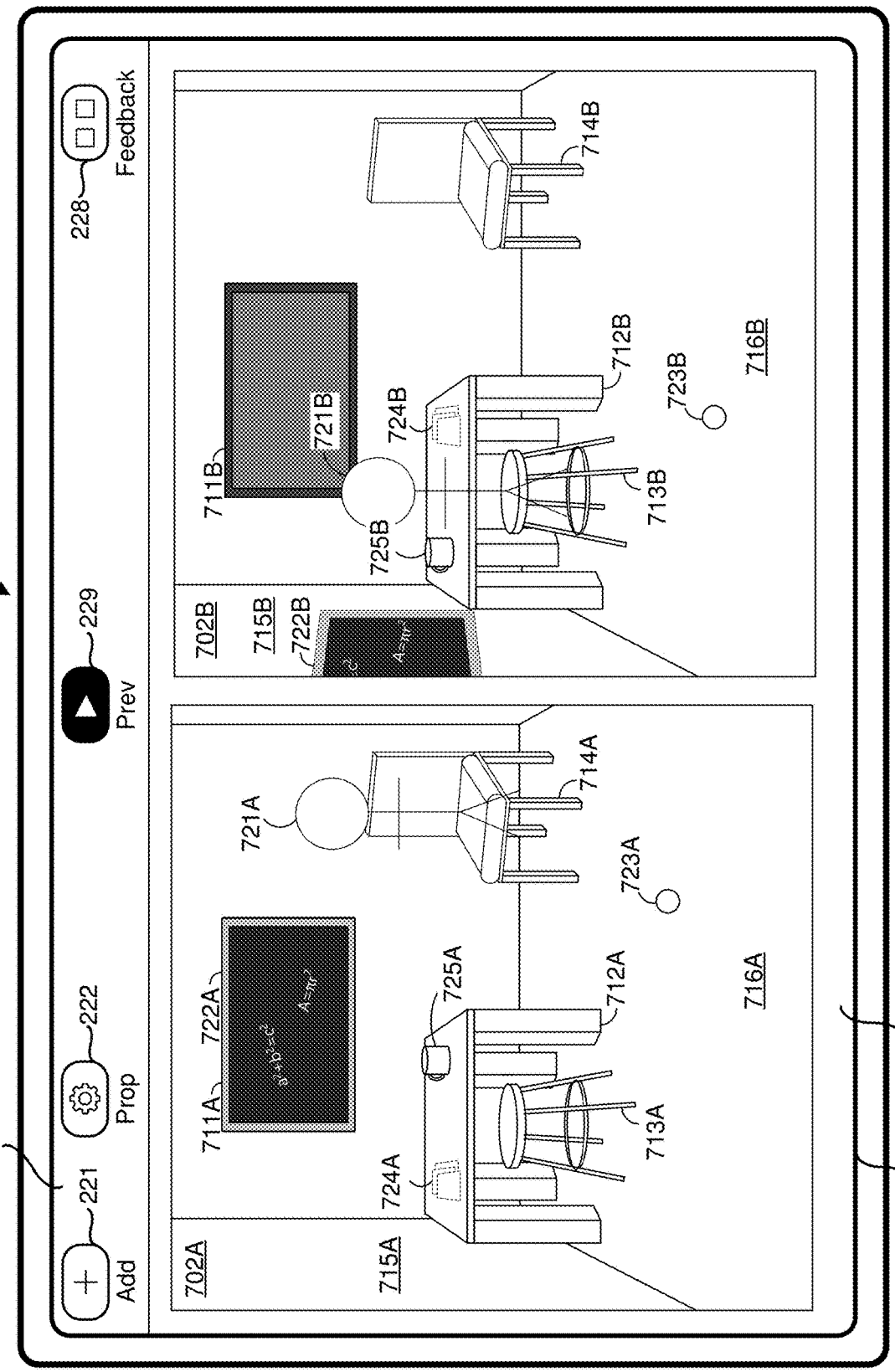

FIG. 7C illustrates the GUI 201 of FIG. 7B at the end of the scene when the virtual professor objective-effectuator has sat down. Thus, in the first preview sub-region 702A, the representation of the virtual professor objective-effectuator 721A is displayed sitting on the representation of the virtual chair 714A. Further, in the second preview sub-region 702B, the representation of the virtual professor objective-effectuator 721A is displayed sitting on the representation of the virtual stool 713B.

The user can select which of the side-by-side previews is preferred. In response to user selection of the first preview sub-region 702A or the second preview sub-region 702B, the electronic device 110 generates user feedback regarding the preview of the scene. Based on the user feedback and, in various implementations, other user feedback received during the display of other previews, the electronic device 110 modifies the scene. For example, in various implementations, the electronic device 110 adds a property to a virtual asset or a physical asset. In various implementations, the property may be an optional property or a required property. For example, in various implementations, in response to user selection of one or more previews in which the virtual professor objective-effectuator sits on the virtual chair, in addition to the required property that the virtual professor objective-effectuator sits on a professor-sittable object, the electronic device 110 adds an optional property that the virtual professor objective-effectuator sit on object classified as a "CHAIR" or a "SOFA" (if one is present in the environment). As another example, in various implementations, in response to user selection of one or more previews in which the virtual blackboard is displayed on the virtual wall, in addition to the required property that the virtual blackboard object be displayed on a blackboard-displayable object, the electronic device 110 adds a property that the virtual blackboard object be displayed on the largest blackboard-displayable object.

Figure 8:
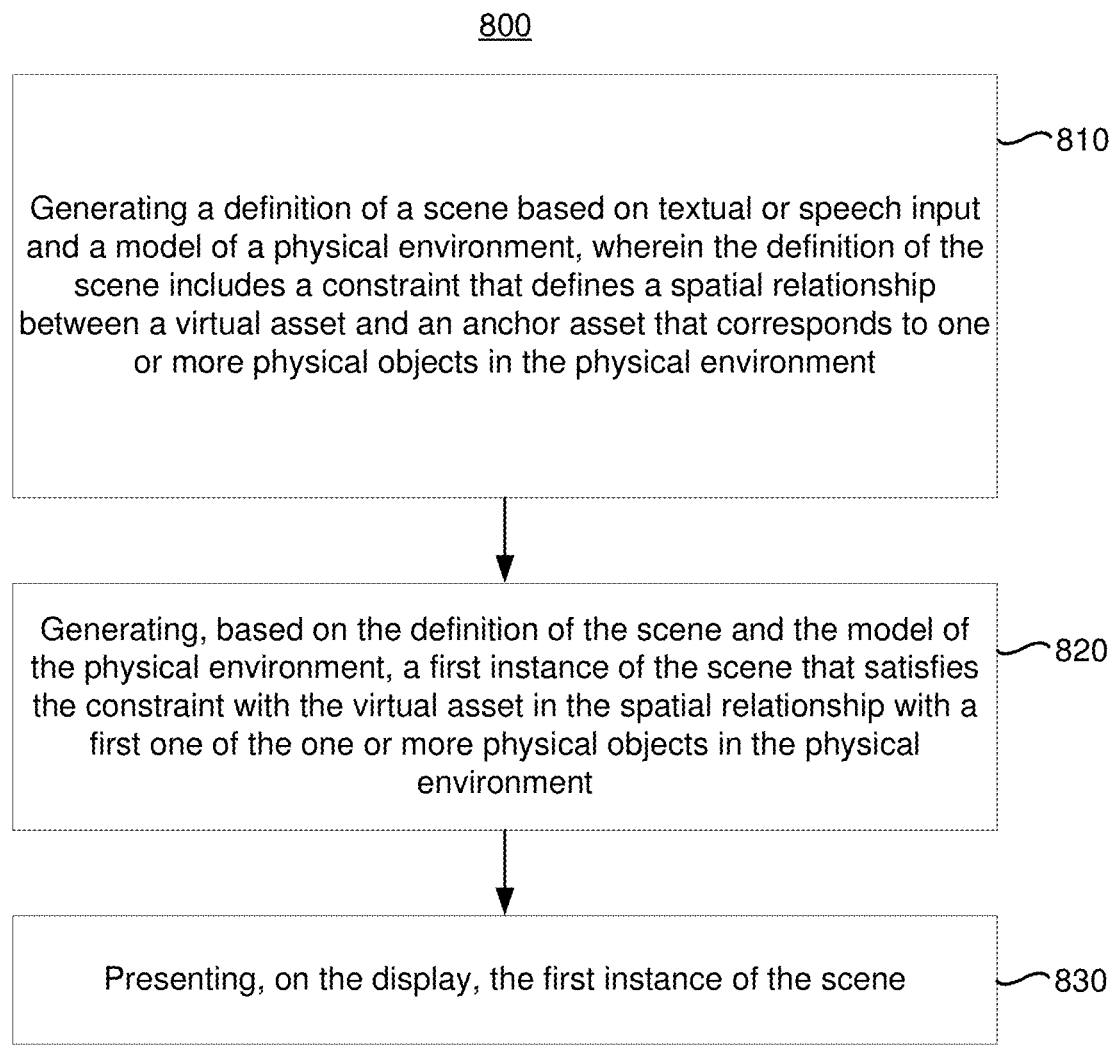
FIGS. 8-10 are flowchart representations of methods of composing a scene in accordance with some implementations.

FIG. 8 is a flowchart representation of a method 800 of composing a scene in accordance with some implementations. In various implementations, the method 800 is performed by a device with a display, one or more processors, and non-transitory memory. In some implementations, the method 800 is performed by processing logic, including hardware, firmware, software, or a combination thereof. In some implementations, the method 800 is performed by a processor executing instructions (e.g., code) stored in a non-transitory computer-readable medium (e.g., a memory).

The method 800 begins, in block 810, with the device generating a definition of a scene based on textual or speech input and a model of a physical environment. The definition includes a constraint that defines a spatial relationship between a virtual asset and an anchor asset that corresponds to one or more physical objects in the physical environment. For example, in various implementations, the definition of the scene is generated by a neural network applied to the textual or speech input and the model of a physical environment.

For example, the example definition of the scene defined in FIGS. 2A-2F, includes, as illustrated in FIG. 2E, a spatial relationship between the virtual professor objective-effectuator and the anchor floor as a property of the virtual professor objective-effectuator. As another example, the example definition of the scene includes, as illustrated in FIG. 2E, a spatial relationship between the virtual blackboard and the anchor vertical plane as a property of the virtual blackboard.

The method 800 continues, in block 820, with the device generating, based on the definition of the scene and the model of the physical environment, a first instance of the scene that satisfies the constraint with the virtual asset in the spatial relationship with a first one of the one or more physical objects in the physical environment. The method 800 continues, in block 830, with the device presenting, on the display, the first instance of the scene.

For example, in FIG. 6B, the electronic device 110 displays an instance of the scene that satisfies the constraint with the representation of the virtual professor objective-effectuator 721A in the spatial relationship with the representation floor 716B corresponding to the anchor floor and with the representation of the virtual blackboard 722A in the spatial relationship with the representation of the television 711A corresponding to the anchor vertical plane.

In various implementations, the method 800 further includes receiving, from a user, user feedback regarding the first instance of the scene and modifying the definition of the scene based on the user feedback. In various implementations, the user feedback includes a positive indication or a negative indication, such as a thumbs-up or thumbs-down. In various implementations, the user feedback includes a numerical ranking, such as a number of stars. In various implementations, the user feedback includes a preference between the first instance of the scene and a second instance of the scene. In various implementations, the user feedback includes gaze information of the user, e.g., where the user looks during display of the first instance of the scene.

In various implementations, modifying the definition of the scene includes adding or modifying a definition of a property of the virtual asset or the anchor asset. In various implementations, adding or modifying the definition of the property is based on a user acceptance of a proposed addition or modification. In various implementations, the properties of the scene are defined using a programming language. Thus, in various implementations, modifying the scene includes adding programming language to the definition of the scene. In various implementations, the properties of the scene are defined with a reward function. Thus, in various implementations, modifying the definition of the scene includes modifying the reward function. In various implementations, the properties of the scene are defined by a neural network. Thus, in various implementations, modifying the definition of the scene includes modifying the neural network, e.g., changing one or more weights of the neural network.

In various implementations, the method 800 further includes generating, based on the definition of the scene and the model of the physical environment, a second instance of the scene that satisfies the constraint with the particular virtual asset in the spatial relationship with a second one of the one or more physical objects in the physical environment and presenting, on the display, the second instance of the scene. In various implementations, the second instance of the scene is displayed simultaneously with the first instance of the scene. For example, in FIG. 7B, the electronic device 110 displays side-by-side previews of the scene.

Figure 9:
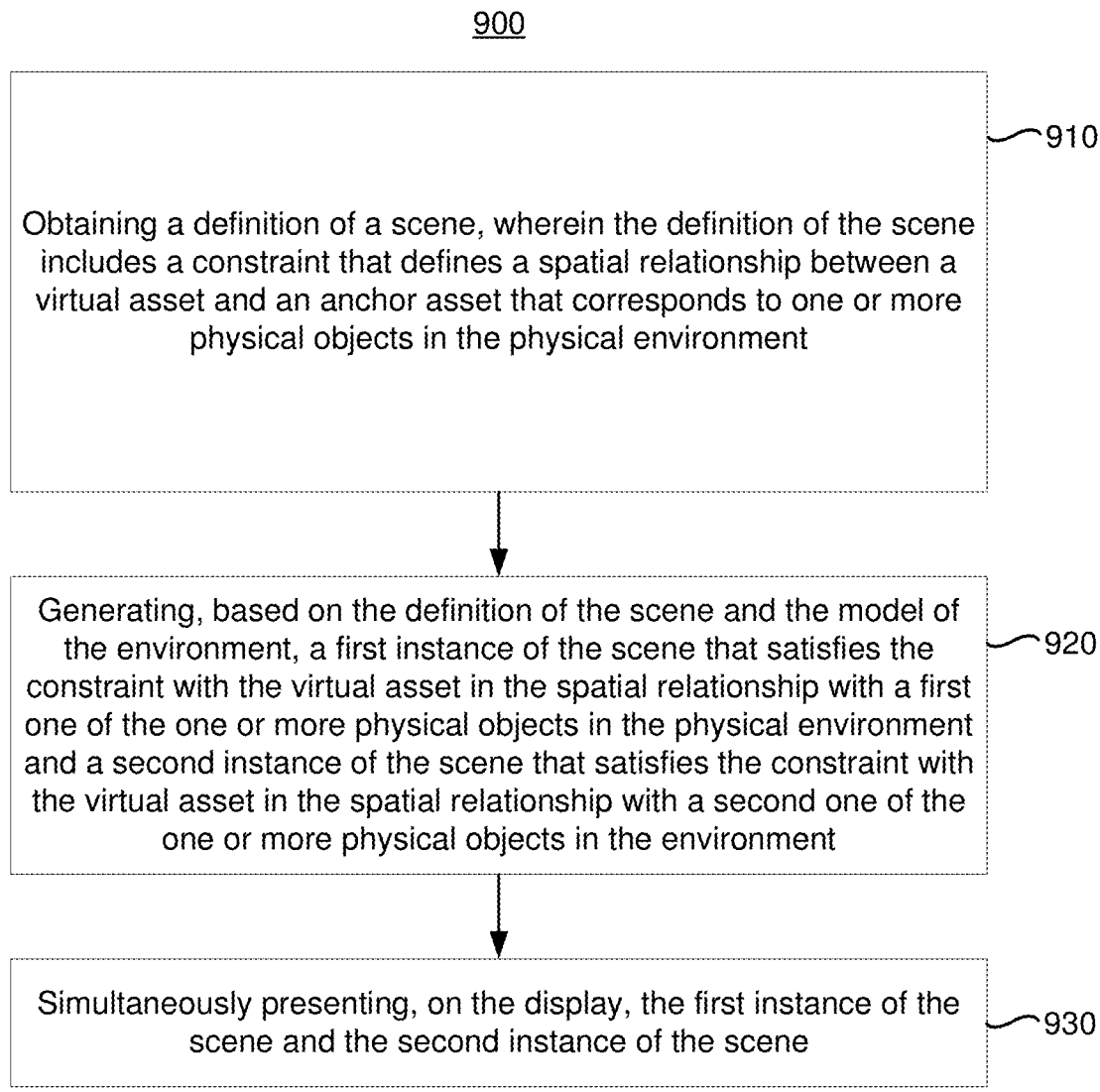

FIG. 9 is a flowchart representation of a method 900 of composing a scene in accordance with some implementations. In various implementations, the method 900 is performed by a device with a display, one or more processors, and non-transitory memory. In some implementations, the method 900 is performed by processing logic, including hardware, firmware, software, or a combination thereof. In some implementations, the method 900 is performed by a processor executing instructions (e.g., code) stored in a non-transitory computer-readable medium (e.g., a memory).

The method 900 begins, in block 910, with the device obtaining a definition of a scene, wherein the definition includes a constraint that defines a spatial relationship between a virtual asset and an anchor asset that corresponds to one or more objects in an environment. In various implementations, the environment is a physical environment. In various implementations, the environment is a virtual environment.

The method 900 continues, in block 920, with the device generating, based on the definition of the scene and a model of the environment, a first instance of the scene that satisfies the constraint with the virtual asset in the spatial relationship with a first one of the one or more objects in the environment and a second instance of the scene that satisfies the constraint with the virtual object in the spatial relationship with a second one of the one or more objects in the environment. The method 900 continues, in block 930, with the device simultaneously presenting, on the display, the first instance of the scene and the second instance of the scene. For example, in FIG. 7B, the electronic device 110 displays side-by-side previews of the scene. In the first preview, the representation of the virtual blackboard 722A is displayed in the spatial relationship with the representation of the television 711A. In the second preview, the representation of the virtual blackboard 722A is displayed in the spatial relationship with the representation of the wall 715A.

In various implementations, the method 900 further includes receiving, from a user, user feedback regarding the first instance of the scene and the second instance of the scene and modifying the definition of the scene based on the user feedback. In various implementations, the user feedback includes a preference between the first instance of the scene and the second instance of the scene.

In various implementations, modifying the definition of the scene includes adding or modifying a definition of a property of the virtual asset or the anchor asset. In various implementations, adding or modifying the definition of the property is based on a user acceptance of a proposed addition or modification. In various implementations, the properties of the scene are defined using a programming language. Thus, in various implementations, modifying the scene includes adding programming language to the definition of the scene. In various implementations, the properties of the scene are defined with a reward function. Thus, in various implementations, modifying the definition of the scene includes modifying the reward function. In various implementations, the properties of the scene are defined by a neural network. Thus, in various implementations, modifying the definition of the scene includes modifying the neural network, e.g., changing one or more weights of the neural network.

Figure 10:
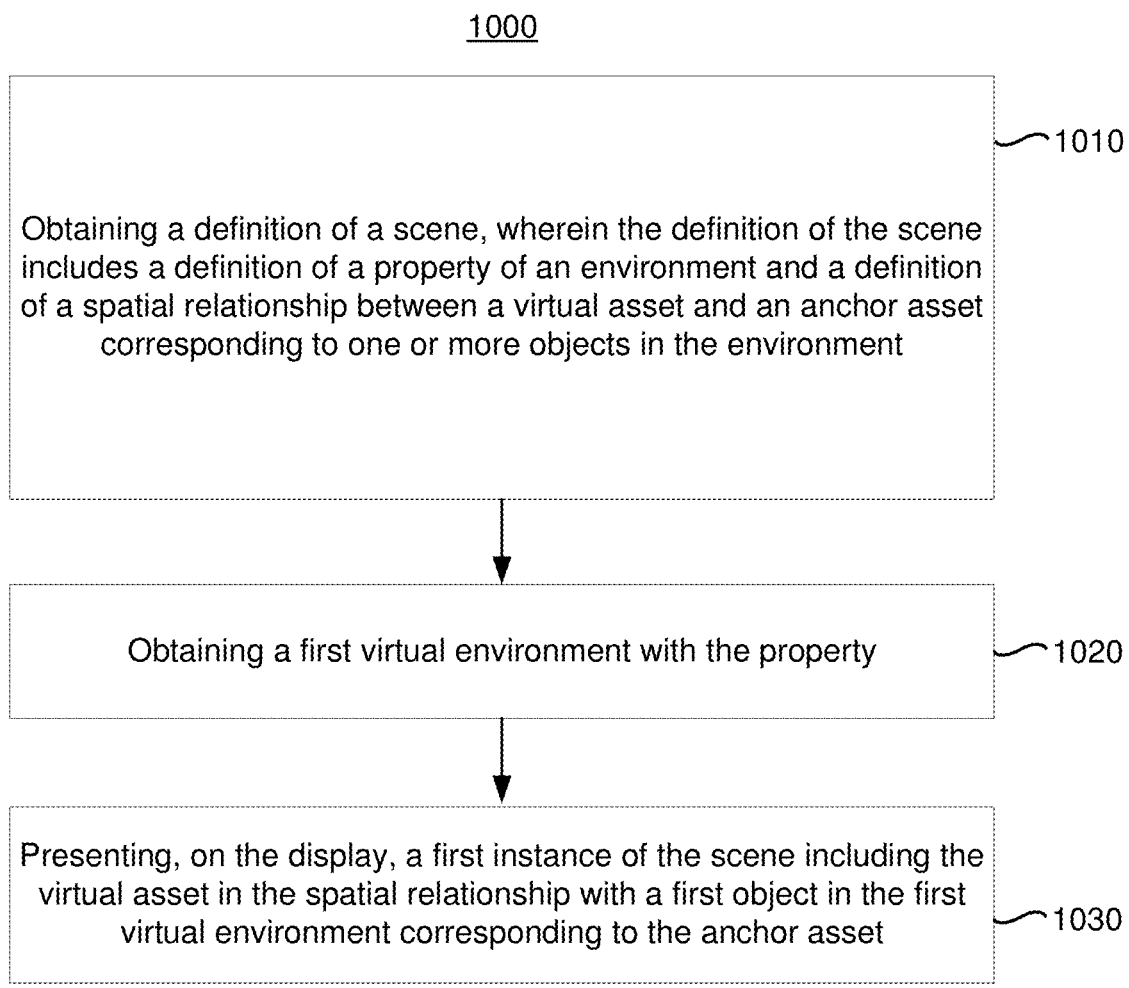

FIG. 10 is a flowchart representation of a method 1000 of composing a scene in accordance with some implementations. In various implementations, the method 1000 is performed by a device with a display, one or more processors, and non-transitory memory. In some implementations, the method 1000 is performed by processing logic, including hardware, firmware, software, or a combination thereof. In some implementations, the method 1000 is performed by a processor executing instructions (e.g., code) stored in a non-transitory computer-readable medium (e.g., a memory).

The method 1000 begins, in block 1010, with the device obtaining a definition of a scene. The definition of the scene includes a definition of a property of an environment and a definition of a spatial relationship between a virtual asset and an anchor asset corresponding to one or more objects of the environment.

For example, the example definition of the scene includes, as illustrated in FIG. 2D, a property of the anchor vertical plane that is a constraint that the anchor vertical plane is blackboard-displayable which is a property of the environment that it includes such a vertical plane. As another example, the example definition of the scene includes, as illustrated in FIG. 2D, a property of the second anchor horizontal plane that is a constraint that the second anchor horizontal plane is at a location at least 0.5 meters off the ground which is a property of the environment that it includes such a horizontal plane.

For further example, the example definition of the scene includes, as illustrated in FIG. 2E, a property of the virtual professor objective-effectuator that is a spatial relationship between the virtual professor objective-effectuator and the anchor floor. As another example, the example definition of the scene includes, as illustrated in FIG. 2E, a property of the virtual blackboard that is a spatial relationship between the virtual blackboard and the anchor vertical plane.

In various implementations, obtaining the definition of the scene includes generating the one or more definitions of the properties via a user interface, as described above with respect to FIGS. 2A-2D. In various implementations, obtaining the definition of the scene includes generating the definition of the scene based on verbal input and a model of a physical environment. In various implementations, the verbal input is vocal (e.g., speech of the user). In various implementations, the verbal input is textual (e.g., typed by the user or derived by a speech-to-text algorithm). For example, in various implementations, the definition of the scene is generated by a neural network applied to the verbal input and the model of a physical environment.

The method 1000 continues, in block 1020, with the device obtaining a first virtual environment with the property. For example, in FIG. 5A, the first virtual environment satisfies two example properties of the example definition of the scene by including the virtual carpet floor 516 that corresponds to the anchor floor and including the virtual ottoman 515 that is professor-sittable and corresponds to the first anchor horizontal plane. In various implementations, the first virtual environment satisfies all constraints of the definition of the scene.

In various implementations, obtaining the first virtual environment includes selecting, based on the property, the first virtual environment from a database of virtual environments, e.g., selecting a virtual environment that has the property. In various implementations, obtaining the first virtual environment includes generating, based on the property, the first virtual environment, e.g., generating a virtual environment that has the property. For example, in various implementations, generating the first virtual environment includes modifying, based on the property, a different virtual environment, e.g., modifying the different virtual environment to have the property.

In various implementations, the first virtual environment is based on a physical environment remote from the device. Thus, by repeatedly previewing the scene, a user experiences what other users in various physical environments would experience and can modify the definition of the scene to provide a predictable and pleasurable experience.

The method 1000 continues, in block 1030, with the device presenting, on the display and based on the definition of the scene, a first instance of the scene including the virtual asset in the spatial relationship with a first object in the first virtual environment corresponding to the anchor asset. For example, in FIG. 5B, the electronic device 110 displays the representation of the virtual blackboard 522 in the spatial relationship (e.g., on) with the virtual mirror 511 that corresponds to the anchor vertical plane.

In various implementations, the method 1000 further includes receiving, from a user, user feedback regarding the first instance of the scene and modifying the definition of the scene based on the user feedback. In various implementations, the user feedback includes a positive indication or a negative indication, such as a thumbs-up or thumbs-down. In various implementations, the user feedback includes a numerical ranking, such as a number of stars. In various implementations, the user feedback includes a preference between the first instance of the scene and a second instance of the scene. In various implementations, the user feedback includes gaze information of the user, e.g., where the user looks during presentation of the first instance of the scene.

In various implementations, modifying the definition of the scene includes adding or modifying a definition of a property of the virtual asset or the anchor asset. In various implementations, adding or modifying the definition of the property of the virtual asset or the anchor asset is based on a user acceptance of a proposed addition or modification. In various implementations, the properties of the scene are defined using a programming language. Thus, in various implementations, modifying the scene includes adding programming language to the definition of the scene. In various implementations, the properties of the scene are defined with a reward function. Thus, in various implementations, modifying the definition of the scene includes modifying the reward function. In various implementations, the properties of the scene are defined by a neural network. Thus, in various implementations, modifying the definition of the scene includes modifying the neural network, e.g., changing one or more weights of the neural network.

In various implementations, the method 1000 further includes presenting, on the display and based on the definition of the scene, a second instance of the scene including the virtual asset in the spatial relationship with a second object of the first virtual environment corresponding to the anchor asset. In various implementations, the second instance of the scene is displayed simultaneously with the first instance of the scene. For example, in FIG. 7B, the electronic device 110 displays side-by-side previews of the scene.

In various implementations, the method 1000 further includes obtaining a second virtual environment with the property and presenting, on the display and based on the definition of the scene, a second instance of the scene including the virtual asset in the spatial relationship with an object in the second virtual environment corresponding to the anchor asset. For example, in FIG. 6B, the electronic device 110 displays the representation of the virtual blackboard 622 in the spatial relationship (e.g., on) with the virtual whiteboard 611 that corresponds to the anchor vertical plane.

Figure 11:
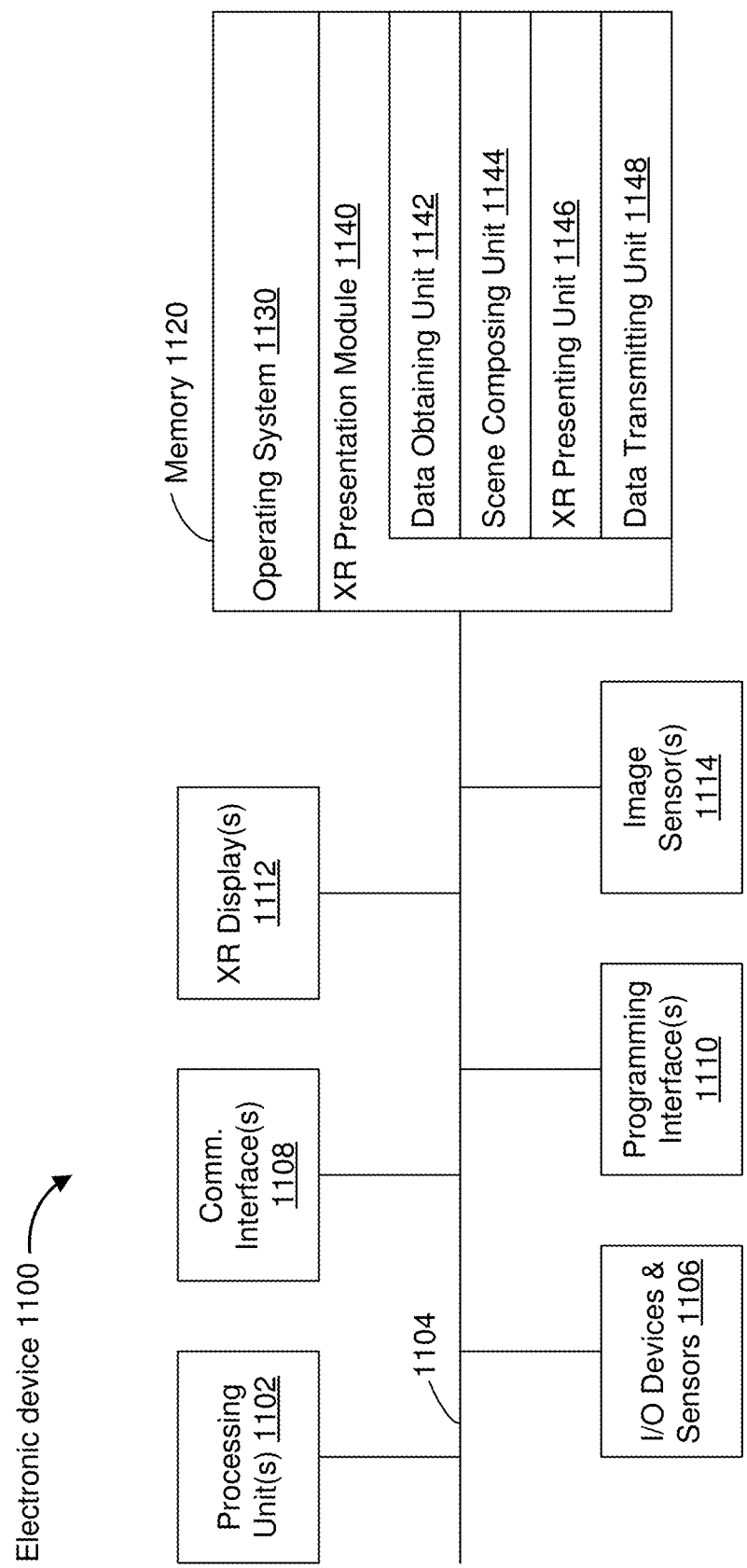
FIG. 11 is a block diagram of an electronic device in accordance with some implementations.

FIG. 11 is a block diagram of an electronic device 1100 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 1100 includes one or more processing units 1102 (e.g., microprocessors, ASICS, FPGAs, GPUs, CPUs, processing cores, and/or the like), one or more input/output (I/O) devices and sensors 1106, one or more communication interfaces 1108 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 1110, one or more XR displays 1112, one or more optional interior- and/or exterior-facing image sensors 1114, a memory 1120, and one or more communication buses 1104 for interconnecting these and various other components.

In some implementations, the one or more communication buses 1104 include circuitry that interconnects and controls communications between system components. In some implementations, the one or more I/O devices and sensors 1106 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more XR displays 1112 are configured to present XR content to the user. In some implementations, the one or more XR displays 1112 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more XR displays 1112 correspond to diffractive, reflective, polarized, holographic, etc. waveguide displays. For example, the electronic device 1100 includes a single XR display. In another example, the electronic device 1100 includes an XR display for each eye of the user. In some implementations, the one or more XR displays 1112 are capable of presenting AR, MR, and/or VR content.

In various implementations, the one or more XR displays 1112 are video passthrough displays which display at least a portion of a physical environment as an image captured by a scene camera. In various implementations, the one or more XR displays 1112 are optical see-through displays which are at least partially transparent and pass light emitted by or reflected off the physical environment.

In some implementations, the one or more image sensors 1114 are configured to obtain image data that corresponds to at least a portion of the face of the user that includes the eyes of the user (and may be referred to as an eye-tracking camera). In some implementations, the one or more image sensors 1114 are configured to be forward-facing so as to obtain image data that corresponds to the scene as would be viewed by the user if the electronic device 1110 was not present (and may be referred to as a scene camera). The one or more optional image sensors 1114 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 1120 includes high-speed random-access memory, such as DRAM, SRAM, DDR RAM, or other random-access solid-state memory devices. In some implementations, the memory 1120 includes non-volatile memory, such as one or more magnetic disk storage devices, optical disk storage devices, flash memory devices, or other non-volatile solid-state storage devices. The memory 1120 optionally includes one or more storage devices remotely located from the one or more processing units 1102. The memory 1120 comprises a non-transitory computer readable storage medium. In some implementations, the memory 1120 or the non-transitory computer readable storage medium of the memory 1120 stores the following programs, modules and data structures, or a subset thereof including an optional operating system 1130 and an XR presentation module 1140.

The operating system 1130 includes procedures for handling various basic system services and for performing hardware dependent tasks. In some implementations, the XR presentation module 1140 is configured to present XR content to the user via the one or more XR displays 1112. To that end, in various implementations, the XR presentation module 1140 includes a data obtaining unit 1142, a scene composing unit 1144, an XR presenting unit 1146, and a data transmitting unit 1148.

In some implementations, the data obtaining unit 1142 is configured to obtain data (e.g., presentation data, interaction data, sensor data, location data, etc.). The data may be obtained from the one or more processing units 1102 or another electronic device. To that end, in various implementations, the data obtaining unit 1142 includes instructions and/or logic therefor, and heuristics and metadata therefor.

In some implementations, the scene composing unit 1144 is configured to provide an interface for composing a scene for execution in association with a physical environment. To that end, in various implementations, the scene composing unit 1144 includes instructions and/or logic therefor, and heuristics and metadata therefor.

In some implementations, the XR presenting unit 1146 is configured to present XR content via the one or more XR displays 1112. For example, in various implementations, the XR presenting unit 1146 is configured to execute a scene in association with a physical environment. To that end, in various implementations, the XR presenting unit 1146 includes instructions and/or logic therefor, and heuristics and metadata therefor.

In some implementations, the data transmitting unit 1148 is configured to transmit data (e.g., presentation data, location data, etc.) to the one or more processing units 1102, the memory 1120, or another electronic device. To that end, in various implementations, the data transmitting unit 1148 includes instructions and/or logic therefor, and heuristics and metadata therefor.

Although the data obtaining unit 1142, the scene composing unit 1144, the XR presenting unit 1146, and the data transmitting unit 1148 are shown as residing on a single electronic device 1100, it should be understood that in other implementations, any combination of the data obtaining unit 1142, the scene composing unit 1144, the XR presenting unit 1146, and the data transmitting unit 1148 may be located in separate computing devices.

Moreover, FIG. 11 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 11 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at a device including a display, one or more processors, and non-transitory memory:
   generating a definition of a scene based on textual or speech input and a model of an environment, wherein the definition of the scene includes a constraint that defines a spatial relationship between a virtual asset and an anchor asset that corresponds to one or more objects in the environment;
   generating, based on application of the definition of the scene to a first physical environment, a first instance of the scene that satisfies the constraint with the virtual asset in the spatial relationship with a first one of the one or more objects in the first physical environment;
   presenting, on the display, the first instance of the scene;
   generating, based on application of the definition of the scene to a second physical environment, a second instance of the scene that satisfies the constraint with the virtual asset in the spatial relationship with a second one of the one or more objects in the second physical environment; and
   presenting, on the display, the second instance of the scene.

2. The method of claim 1, further comprising:
   receiving, from a user, user feedback regarding the first instance of the scene; and
   modifying the definition of the scene based on the user feedback.

3. The method of claim 2, wherein the user feedback includes a positive indication or a negative indication.

4. The method of claim 2, wherein the user feedback includes a numerical ranking.

5. The method of claim 2, wherein the user feedback includes a preference between the first instance of the scene and a second instance of the scene.

6. The method of claim 2, wherein the user feedback includes gaze information of the user.

7. The method of claim 2, wherein modifying the definition of the scene includes adding or modifying a definition of a property of the virtual asset or the anchor asset.

8. The method of claim 7, wherein adding or modifying the definition of the property is based on a user acceptance of a proposed addition or modification.

9. The method of claim 2, wherein modifying the definition of the scene includes modifying a reward function.

10. The method of claim 2, wherein modifying the definition of the scene includes modifying a neural network.

11. The method of claim 1, wherein the second instance of the scene is displayed simultaneously with the first instance of the scene.

12. A device comprising:
   a display;
   non-transitory memory; and
   one or more processors to:
      obtain a definition of a scene, wherein the definition of the scene includes a constraint that defines a spatial relationship between a virtual asset and an anchor asset that corresponds to one or more objects in an environment;
      generate, based on application of the definition of the scene to a first environment, a first instance of the scene that satisfies the constraint with the virtual asset in the spatial relationship with a first one of the one or more objects in the first environment;
      generate, based on application of the definition of the scene to a second environment, a second instance of the scene that satisfies the constraint with the virtual asset in the spatial relationship with a second one of the one or more objects in the second environment; and
      simultaneously present, on the display, the first instance of the scene and the second instance of the scene.

13. The device of claim 12, wherein the one or more processors are further to:
   receive, from a user, user feedback regarding the first instance of the scene and the second instance of the scene; and
   modify the definition of the scene based on the user feedback.

14. The device of claim 13, wherein the user feedback includes a preference between the first instance of the scene and the second instance of the scene.

15. The device of claim 13, wherein the one or more processors are to modify the definition of the scene by adding or modifying a definition of a property of the virtual asset or the anchor asset.

16. The device of claim 12, wherein the first environment is a first physical environment and the second environment is a first virtual environment.

17. A non-transitory memory having instructions encoded thereon which, when executed by one or more processors of a device, cause the device to:
  obtain a definition of a scene, wherein the definition of the scene includes a definition of a property of an environment and a definition of a spatial relationship between a virtual asset and an anchor asset corresponding to one or more objects in the environment;
  obtain a first virtual environment with the property;
  present, on a display and based on application of the definition of the scene to the first virtual environment, a first instance of the scene including the virtual asset in the spatial relationship with a first object in the first virtual environment corresponding to the anchor asset;
  obtain a second virtual environment with the property; and
  present, on the display and based on application of the definition of the scene to the second virtual environment, a second instance of the scene including the virtual asset in the spatial relationship with a second object in the second virtual environment corresponding to the anchor asset.

18. The non-transitory memory of claim 17, wherein the first virtual environment is based on a physical environment remote from the device.

19. The non-transitory memory of claim 17, wherein the instructions, when executed, further cause the device to:
  receive, from a user, user feedback regarding the first instance of the scene; and
  modify the definition of the scene based on the user feedback.

20. The non-transitory memory of claim 19, wherein the user feedback includes a positive indication or a negative indication.

* * * * *